(12) United States Patent
Tenny et al.

(10) Patent No.: US 8,682,327 B2
(45) Date of Patent: Mar. 25, 2014

(54) RESOURCE SEARCH IN A COMMUNICATION NETWORK

(75) Inventors: Nathan Edward Tenny, Poway, CA (US); Masato Kitazoe, Hachiouji (JP); Subashini Krishnamurthy, San Diego, CA (US); Bhupesh Manoharlal Umatt, Poway, CA (US)

(73) Assignee: Qualcomm Incorporated, San Diego, CA (US)

( * ) Notice: Subject to any disclaimer, the term of this patent is extended or adjusted under 35 U.S.C. 154(b) by 416 days.

(21) Appl. No.: 12/722,494

(22) Filed: Mar. 11, 2010

(65) Prior Publication Data

US 2010/0234026 A1    Sep. 16, 2010

Related U.S. Application Data

(60) Provisional application No. 61/160,206, filed on Mar. 13, 2009.

(51) Int. Cl.
*H04W 36/00* (2009.01)

(52) U.S. Cl.
USPC ............... 455/436; 455/435.1; 455/435.2; 455/453

(58) Field of Classification Search
USPC ............ 455/436, 435.1, 435.2, 435.3, 453
See application file for complete search history.

(56) References Cited

U.S. PATENT DOCUMENTS 5,878,038 A * 3/1999 Willey ..................... 370/335
7,936,721 B2 * 5/2011 Hallenstal et al. ........ 370/331
2003/0129979 A1 * 7/2003 Cooper ..................... 455/432
2004/0087305 A1 * 5/2004 Jiang et al. ............... 455/432.1
2009/0325583 A1 * 12/2009 Burgess et al. ........... 455/444

FOREIGN PATENT DOCUMENTS

CN    101242643 A    8/2008
KR    20070084427 A  8/2007

OTHER PUBLICATIONS

3GPP: "3GPP TS 23.272 v8.3.0; Technical Specification Group services and System Aspects;Circuit Switched Fallback in Evolved packet System; Stage 2 (Release 8)" [online] Mar. 12, 2009, pp. 1-47, XP002582622 Sophia antipolis, France 3rd generation partnership project Retrieved from the Internet: URL:http://www.3gpp.org/ftp/specs/archive/23_series/23.272/23272-830.zip>[Retrived on May 18, 2010] 6 Mobile originating call.

(Continued)

*Primary Examiner* — Temica M Beamer
(74) *Attorney, Agent, or Firm* — Kam T. Tam

(57) ABSTRACT

Methods, apparatus and computer program products are provided to facilitate the acquisition of radio recourses when an initial redirect attempt to acquire the necessary resources fails. The disclosed embodiments enable the determination as to whether or not a desired service is available on a target set of radio resources. Upon the failure to acquire the service, a preferential search of additional radio resources is conducted for acquisition of the service. The disclosed concepts are applicable to a variety of technologies, such as UMTS, GSM, 3GPP WCDMA and LTE, 3GPP2 1xRTT and HRPD, WLAN, WiMAX, DSL and passive optical network (PON). This Abstract is provided for the sole purpose of complying with the Abstract requirement rules that allow a reader to quickly ascertain the disclosed subject matter. Therefore, it is to be understood that it should not be used to interpret or limit the scope or the meaning of the claims.

50 Claims, 12 Drawing Sheets

(56) References Cited

OTHER PUBLICATIONS

3GPP TS 36.304 v8.4.0; Technical Specification Group Radio Access Network; Evolved Universal Terrestrial Radio Access (E-UL-TRA); User Equipment (UE) procedures in idle mode (Release 8) [Online] Dec. 31, 2008 pp. 1-29, XP002582623 Sophia Antipolis, France,3rd generation partnership project Retrieved from the Internet: URL:http:/www.3gpp.org/ftp/specs/archive/36_series/36.304/36304-840.zip>[retrieved on May 18, 2010].

Alcatel-Lucent: Feb. 24, 2009, 3GPP Draft; C1-090213_CSFB_Causes_1X, 3rd Generation Partnership Project (3GPP), Mobile Competence Centre; 650, Route Des Lucioles; F-06921 Sophia-Antipolis Cedex; France, XP050310693 the whole document.

Huawei; "CS capability of network for CS fallback (R3-081160)" [online] May 9, 2008, pp. 1-5, XP002582621 kansa city, USA 3GPP TSG-RAN WG3 60 Retrieved from the Internet: URL:http://ftp.3gpp.org/ftp/tsg_ran/WG3_lu/TSGR3_60/Docs/R3-081160.zip> [retrieved on May 18, 2010] the whole document.

International Search Report and Written Opinion—PCT/US2010/027228—ISA/EPO—Jun. 16, 2010.

QUALCOMM Europe: "Handling of failure at inter-RAT redirection", 3GPP Draft; R2-092037, 3rd Generation Partnership Project (3GPP), Mobile Competence Centre ; 650, Route Des Lucioles ; F-06921 Sophia-Antipolis Cedex; France, No. Seoul, Korea; Mar. 16, 2009, XP050339923. [retrieved on Mar. 16, 2009].

HTC Corporation: "The methods to control load balance in LTE system", 3GPP TSG-RAN #68bis, R2-100459, Jan. 18-22, 2010.

Qualcomm Europe: "CSFB based on redirection by RRC connection release" 3GPP TSG SA WG2 Meeting #73, S2-094200, May, 11-15, 2009.

Taiwan Search Report—TW099107337—TIPO—Feb. 6, 2013.

\* cited by examiner

RESOURCE SEARCH IN A COMMUNICATION NETWORK

CROSS REFERENCE TO RELATED APPLICATION(S)

The present application claims priority to U.S. Provisional Patent Application Ser. No. 61/160,206, entitled "Preferential Searching on Target in Case of Redirection Failure", filed Mar. 13, 2009, the entirety of which is hereby incorporated by reference.

FIELD OF INVENTION

The present disclosure relates generally to the field of wireless communications. More particularly, the present disclosure relates to facilitating search for radio recourses in case of an initial failure to acquire the desired radio resources.

BACKGROUND

This section is intended to provide a background or context to the disclosed embodiments. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple communication devices. Each terminal can communicate with one or more base stations through transmissions on the forward and reverse links. The forward link (or downlink) refers to the communication link from the base stations to the communication device, and the reverse link (or uplink) refers to the communication link from the communication device to the base stations. This communication link can be established through a single-in-single-out, multiple-in-single-out, or a multiple-in-multiple-out (MIMO) system.

In order to take full advantage of services that are provided on other networks, as well as for performing operations such as load balancing within a given network, a communication device may need to release some or all of its current radio resources in order to acquire certain resources within the same or different network. For example, in an LTE system, a communication device may be released from a connected mode through a procedure called "connection release with redirection," which directs the communication device to release its current radio resource control (RRC) connection and move to a target carrier to camp in idle mode. The target carrier may be part of the LTE system (e.g., if the network is attempting to keep its camping load balanced across frequencies) or part of a different radio access technology (RAT). Non-limiting examples of a RAT include Universal Mobile Telecommunications Systems (UMTS), Mobile Telesystems (MTS), Global Systems for Mobile communications (GSM), Single Carrier Radio Transmission Technologies (1xRTT), High Rate Packet Data (HRPD) and the like.

In a different scenario, redirection of a communication device to a new RAT may be triggered by a circuit switched (CS) fallback procedure that is initiated from the LTE network with either a handover or a cell change order. The CS Fallback allows subscribers to transition to a circuit network to receive voice and/or other services. The CS fallback procedure directs the communication device to move onto a target RAT in an attempt to obtain these services, and the serving cell is chosen based on cell selection towards the RAT and frequency specified in the triggering message. In these and other types of "redirection procedures," the current network directs the communication device to seek services on another RAT and provides information to guide the communication device in its search for an appropriate serving cell on the target RAT.

When a communication device is unable to procure the appropriate resources in a redirection attempt, traditional failure handling procedures tend to bring the communication device back to the original serving network. However, in some cases, it might be more desirable if the communication device does not return to the original network. For example, a communication device may be directed from an original LTE system, which does not support VoIP, to a CS-capable RAT in order to obtain VoIP services. In such a case, a return to the original LTE network may trigger another redirect to a CS-capable RAT, followed by another return to the LTE network, causing a back-and-forth ping-pong action between the two networks that prevents the communication device from obtaining the required services. It is, therefore, advantageous to provide intelligent redirect procedures that facilitate the procurement of resources when the initial redirect attempt for acquiring the target resources fails.

SUMMARY OF THE INVENTION

The various embodiments relate to systems, methods, apparatus and computer program products relating to preferential search of additional radio resources when an initial redirection attempt to acquire a set of resources fails.

One disclosed aspect relates to a method of determining, on a communication device, an availability of a service on a target set of radio resources from information related to a redirection of the communication device for acquisition of the service, and conducting a preferential search of additional radio resources for acquisition of the service. For example, the additional radio resources can be different from the target set of radio resources. In one embodiment, conducting the preferential search is carried out subsequent to a redirection attempt failure, while in another embodiment, the information comprises a cause of the redirection and the preferential search is conducted in accordance with at least the cause of the redirection. For example, the user may perform a particular redirect procedure based on the cause of the redirection. In a further example, the cause of the redirection may be a cause selected from the group consisting of: a load balancing and a circuit switched fallback. In still another example, the redirection is carried out in accordance with a redirection procedure selected from a group consisting of: a handover and a change cell order.

In one embodiment, the information may be received from a source set of radio resources. In such an scenario, the source set of radio resources may comprise a source carrier. In one variation, at least one of the target set of radio resources and the additional radio resources comprises at least a portion of a carrier that is different from the source carrier.

According to another embodiment, the information may also be received from the source set of radio resources. In this embodiment, at least one of the target set of radio resources and the additional radio resources may be associated with a radio access technology that is different from a radio access technology associated with the source set of radio resources. In another embodiment, the target set of radio resources and the additional radio resources are associated with the same radio access technology, while in a different embodiment, the target set of radio resources and the additional radio resources are associated with different radio access technologies. In yet another embodiment, at least one of the additional radio resources is capable of providing the service.

In another provided embodiment, the preferential search is conducted in accordance with at least a type of the service. For example, the type of the service may be a voice call, a communication device terminated emergency call or a communication device originated emergency call. In one embodiment, the additional radio resources may comprise at least one radio resource selected from the group consisting of one or more registered public land mobile networks and one or more non-registered public land mobile networks. In a different embodiment, the preferential search is conducted in accordance with at least a type of service for which a radio resource control connection is requested.

According to other provided embodiments, the information is received from a source set of resources, and the source set of radio resources is excluded from the preferential search for a predetermined period. In one variation, a the predetermined period is determined for at least one of a period related to a communication device terminated service, a period related to a communication device originated service, a period related to an emergency call or a period related to a non-emergency call. In another variation, the predetermined period is determined by an entity associated with the source set of resources or a period determined by the communication device. According to yet another variation, the predetermined period is determined in accordance with a parameter such as a cause of redirection and a duration of the service.

Another aspect of the disclosed embodiments relates to a method of generating an information element, the information element comprising information from a source set of radio resources, the information relating to redirection of a communication device for acquisition of a service on a target set of radio resources, the information enabling a determination that the service is not available on the target set of radio resources and a preferential search of additional radio resources for acquisition of the service. The method also comprises transmitting the information element.

Another disclosed aspect of various embodiments relates to an apparatus that includes a means for determining, on a communication device, an availability of a service on a target set of radio resources from information related to a redirection of the communication device for acquisition of the service. The apparatus further includes a means for conducting a preferential search of additional radio resources for acquisition of the service.

Still another aspect of various embodiments relates to an apparatus that includes a means for generating one or more information elements, where the information element(s) contain information from a source set of radio resources, and the information relates to redirection of a communication device for acquisition of a service on a target set of radio resources. The information also enables a determination that the service is not available on the target set of radio resources and a preferential search of additional radio resources for acquisition of the service. The apparatus also includes a means for transmitting the information element(s).

Another aspect of various disclosed embodiments relate to an apparatus that includes a processor, and a memory containing processor executable code. The computer executable code, when executed by the processor, configures the apparatus to determine, on a communication device, an availability of a service on a target set of radio resources from information related to a redirection of the communication device for acquisition of the service. The computer executable code, when executed by the processor, also configures the apparatus to conduct a preferential search of additional radio resources for acquisition of the service.

In another aspect of various disclosed embodiments, an apparatus is disclosed that includes a processor, and a memory comprising processor executable code. The computer executable code, when executed by the processor, configures the apparatus to transmit information using a source set of radio resources, where the information relates to redirection of a communication device for acquisition of a service on a target set of radio resources. The information further enables a determination that the service is not available on the target set of radio resources and a preferential search of additional radio resources for acquisition of the service.

Another aspect of various disclosed embodiments relates to a computer program product that is embodied on a computer readable medium. The computer program product includes program code for determining, on a communication device, an availability of a service on a target set of radio resources from information related to a redirection of the communication device for acquisition of the service. The computer program product also includes program code for conducting a preferential search of additional radio resources for acquisition of the service.

In still another aspect of various provided embodiments, a computer program product that is embodied on a computer readable medium is provided. The computer program product includes program code for generating an information element, the information element comprising information from a source set of radio resources, the information relating to redirection of a communication device for acquisition of a service on a target set of radio resources, the information enabling a determination that the service is not available on the target set of radio resources and a preferential search of additional radio resources for acquisition of the service. The computer program product also comprises computer code for transmitting the information element.

One advantage provided by some embodiments is that they provide a more efficient manner of locating a desired service on potentially different radio access technologies.

These and other advantages and features of various embodiments, together with the organization and manner of operation thereof, will become apparent from the following detailed description when taken in conjunction with the accompanying drawings, in which like reference numerals are used to refer to like parts throughout.

BRIEF DESCRIPTION OF THE DRAWINGS

Various disclosed embodiments are described by referring to the attached drawings, in which.

Figure 1:
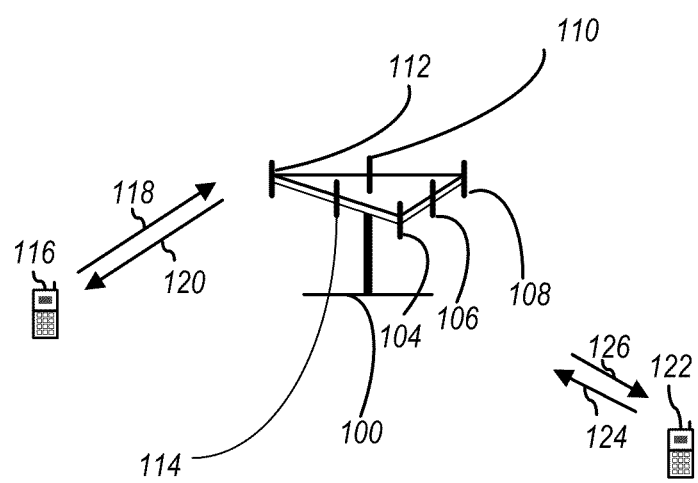
FIG. 1 illustrates a multiple access wireless communication system.

It will be recognized that some or all of the Figures are schematic representations for purposes of illustration and do not necessarily depict the actual relative sizes or locations of the elements shown. The Figures are provided for the purpose of illustrating one or more embodiments with the explicit understanding that they will not be used to limit the scope or the meaning of the claims.

DETAILED DESCRIPTION OF CERTAIN EMBODIMENTS

In the following description, for purposes of explanation and not limitation, details and descriptions are set forth in order to provide a thorough understanding. However, it will be apparent to those skilled in the art that the various embodiments may be practiced in other embodiments that depart from these details and descriptions.

As used herein, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, certain embodiments are described herein in connection with a communication device. A communication device can also be called a user equipment (UE), user terminal, and may contain some or all of the functionality of a system, subscriber unit, subscriber station, mobile station, mobile, wireless terminal, mobile device, node, device, remote station, remote terminal, terminal, wireless communication device, wireless communication apparatus or user agent. A communication device can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station may be utilized for communicating with wireless terminal(s) and can also be called, and may contain some or all of the functionality of, an access point, node, Node B, evolved NodeB (eNB), or some other network entity. A base station communicates over the air-interface with wireless terminals. The communication may take place through one or more sectors. The base station can act as a router between the wireless terminal and the rest of the access network, which can include an Internet Protocol (IP) network, by converting received air-interface frames to IP packets. The base station can also coordinate management of attributes for the air interface, and may also be the gateway between a wired network and the wireless network.

Various aspects, embodiments or features will be presented in terms of systems that may include a number of devices, components, modules, and the like. It is to be understood and appreciated that the various systems may include additional devices, components, modules, and so on, and/or may not include all of the devices, components, modules and so on, discussed in connection with the figures. A combination of these approaches may also be used.

Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

The various disclosed embodiments may be incorporated into a communication system. In one example, such communication system utilizes an orthogonal frequency division multiplex (OFDM) that effectively partitions the overall system bandwidth into multiple ($N_F$) subcarriers, which may also be referred to as frequency sub-channels, tones, or frequency bins. For an OFDM system, the data to be transmitted (i.e., the information bits) is first encoded with a particular coding scheme to generate coded bits, and the coded bits are further grouped into multi-bit symbols that are then mapped to modulation symbols. Each modulation symbol corresponds to a point in a signal constellation defined by a particular modulation scheme (e.g., M-PSK or M-QAM) used for data transmission. At each time interval, which may be dependent on the bandwidth of each frequency subcarrier, a modulation symbol may be transmitted on each of the $N_F$ frequency subcarrier. Thus, OFDM may be used to combat inter-symbol interference (ISI) caused by frequency selective fading, which is characterized by different amounts of attenuation across the system bandwidth.

Generally, a wireless multiple-access communication system can simultaneously support communication for multiple wireless terminals. Each terminal communicates with one or more base stations through transmissions on the forward and reverse links. The forward link (or downlink) refers to the communication link from the base stations to the terminals, and the reverse link (or uplink) refers to the communication link from the terminals to the base stations. This communication link can be established through a single-in-single-out, multiple-in-single-out, or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized. A MIMO system also supports time division duplex (TDD) and frequency division duplex (FDD) systems. In a TDD system, the forward and reverse link transmissions are on the same frequency region so that the reciprocity principle allows the estimation of the forward link channel from the reverse link channel. This enables the base station to extract transmit beamforming gain on the forward link when multiple antennas are available at the base station.

FIG. 1 illustrates a wireless communication system within which the various disclosed embodiments may be implemented. A base station 100 may include multiple antenna groups, and each antenna group may comprise one of more antennas. For example, if the base station 100 comprises six antennas, one antenna group may comprise the first antenna 104 and the second antenna 106, another antenna group may comprise the third antenna 108 and the fourth antenna 110, while a third group may comprise the fifth antenna 112 and the sixth antenna 114. It should be noted that while each of the above-noted antenna groups were identified as having two antennas, more or fewer antennas may be utilized in each antenna group.

Referring back to FIG. 1, a first communication device 116 is illustrated to be in communication with, for example, the fifth antenna 112 and the sixth antenna 114 to enable the transmission of information to the first communication device 116 over a first forward link 120, and the reception of information from the first communication device 116 over a first reverse link 118. FIG. 1 also illustrates a second communication device 122 that is in communication with, for example, the third antenna 108 and the fourth antenna 110 to enable the transmission of information to the second communication device 122 over a second forward link 126, and the reception of information from the second communication device 122 over a second reverse link 124. In a Frequency Division Duplex (FDD) system, the communication links 118, 120, 124, 126 that are shown in FIG. 1 may use different frequencies for communication. For example, the first forward link 120 may use a different frequency than that used by the first reverse link 118.

In some embodiments, each group of antennas and/or the area in which they are designed to communicate is often referred to as a sector of the base station. For example, the different antenna groups that are depicted in FIG. 1 may be designed to communicate to the communication devices in a sector the base station 100. In communication over the forward links 120 and 126, the transmitting antennas of the base station 100 utilize beamforming in order to improve the signal-to-noise ratio of the forward links for the different communication devices 116 and 122. Also, a base station that uses beamforming to transmit to communication devices scattered randomly throughout its coverage area causes less interference to communication devices in the neighboring cells than a base station that transmits omni-directionally through a single antenna to all its communication devices.

The communication networks that may accommodate the various disclosed embodiments may comprise logical channels that are classified into Control Channels and Traffic Channels. Logical control channels may comprise a broadcast control channel (BCCH), which is the downlink channel for broadcasting system control information, a paging control channel (PCCH), which is the downlink channel that transfers paging information, a multicast control channel (MCCH), which is a point-to-multipoint downlink channel used for transmitting multimedia broadcast and multicast service (MBMS) scheduling and control information for one or several multicast traffic channels (MTCHs). Generally, after establishing radio resource control (RRC) connection, MCCH is only used by the communication devices that receive MBMS. Dedicated control channel (DCCH) is another logical control channel that is a point-to-point bi-directional channel transmitting dedicated control information, such as user-specific control information used by the communication devices having an RRC connection. Common control channel (CCCH) is also a logical control channel that may be used for random access information. Logical traffic channels may comprise a dedicated traffic channel (DTCH), which is a point-to-point bi-directional channel dedicated to one communication device for the transfer of user information. Also, a multicast traffic channel (MTCH) may be used for point-to-multipoint downlink transmission of traffic data.

The communication networks that accommodate the disclosed embodiments may additionally comprise logical transport channels that are classified into downlink (DL) and uplink (UL). The DL transport channels may comprise a broadcast channel (BCH), a downlink shared data channel (DL-SDCH), a multicast channel (MCH) and a Paging Channel (PCH). The UL transport channels may comprise a random access channel (RACH), a request channel (REQCH), an uplink shared data channel (UL-SDCH) and plurality of physical channels. The physical channels may also comprise a set of downlink and uplink channels.

In some disclosed embodiments, the downlink physical channels may comprise at least one of a common pilot channel (CPICH), a synchronization channel (SCH), a common control channel (CCCH), a shared downlink control channel (SDCCH), a multicast control channel (MCCH), a shared uplink assignment channel (SUACH), an acknowledgement channel (ACKCH), a downlink physical shared data channel (DL-PSDCH), an uplink power control channel (UPCCH), a paging indicator channel (PICH), a load indicator channel (LICH), a physical broadcast channel (PBCH), a physical control format indicator channel (PCFICH), a physical downlink control channel (PDCCH), a physical hybrid ARQ indicator channel (PHICH), a physical downlink shared channel (PDSCH) and a physical multicast channel (PMCH). The uplink physical channels may comprise at least one of a physical random access channel (PRACH), a channel quality indicator channel (CQICH), an acknowledgement channel (ACKCH), an antenna subset indicator channel (ASICH), a shared request channel (SREQCH), an uplink physical shared data channel (UL-PSDCH), a broadband pilot channel (BPICH), a physical uplink control channel (PUCCH) and a physical uplink shared channel (PUSCH).

In some disclosed embodiments, a channel structure is provided that preserves low PAR (at any given time, the channel is contiguous or uniformly spaced in frequency) properties of a single carrier waveform.

Figure 2:
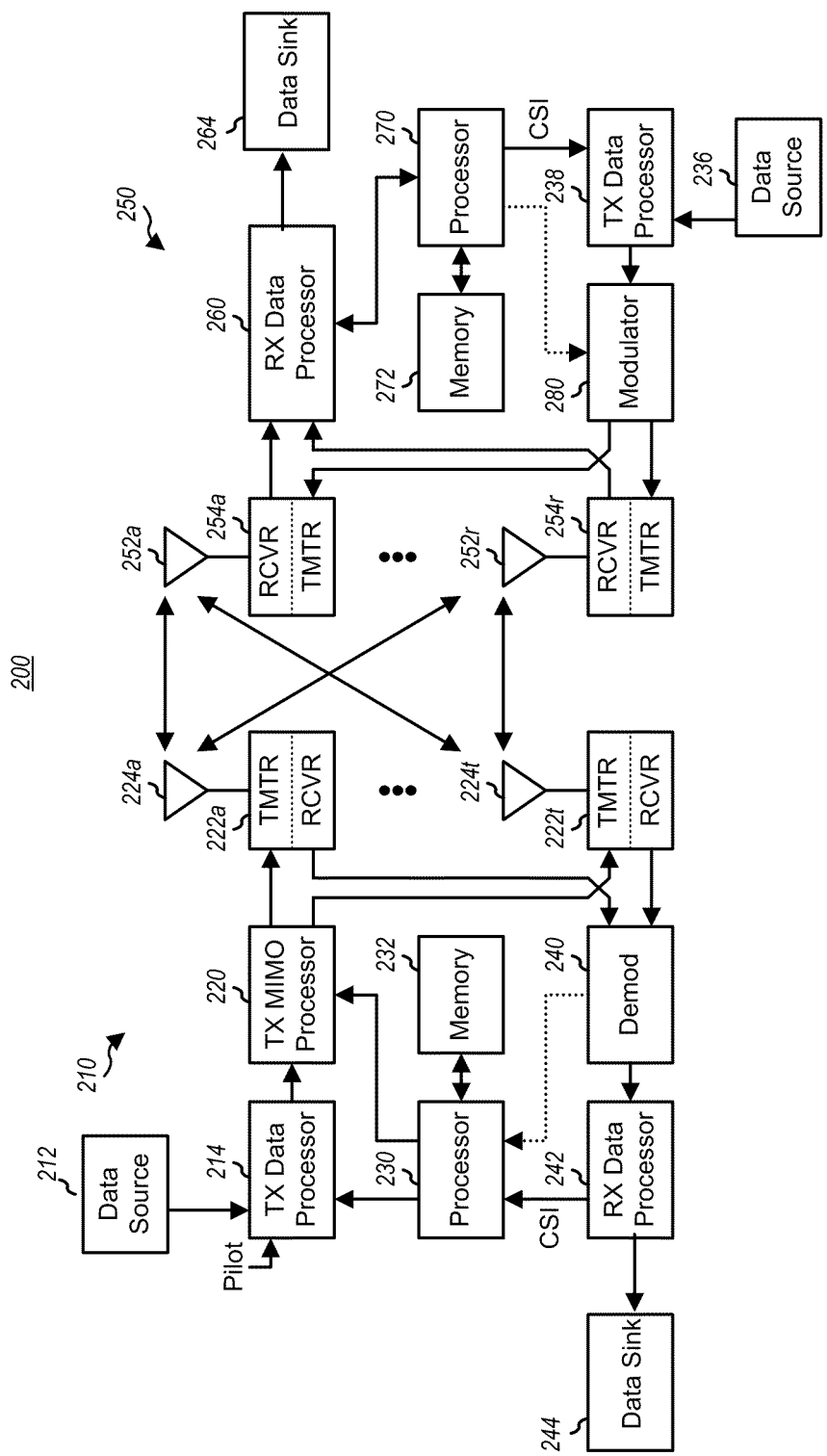
FIG. 2 illustrates a block diagram of a communication system.

It should be also noted that the following abbreviations may be used in describing the various disclosed embodiments:

AM Acknowledged Mode
AMD Acknowledged Mode Data
ARQ Automatic Repeat Request
BCCH Broadcast Control CHannel
BCH Broadcast CHannel
C- Control-
CCCH Common Control CHannel
CCH Control CHannel
CCTrCH Coded Composite Transport Channel
CP Cyclic Prefix
CRC Cyclic Redundancy Check
CS Circuit Switched
CSI Channel State Information
CTCH Common Traffic CHannel
DCCH Dedicated Control CHannel
DCH Dedicated CHannel
DL DownLink
DL-SCH Downlink shared channel
DSCH Downlink Shared CHannel
DTCH Dedicated Traffic CHannel
FACH Forward link Access CHannel
FDD Frequency Division Duplex
L1 Layer 1 (physical layer)
L2 Layer 2 (data link layer)
L3 Layer 3 (network layer)
LI Length Indicator
LSB Least Significant Bit
MAC Medium Access Control
MBMS Multimedia Broadcast Multicast Service
MBSFN Multicast broadcast single frequency network
MCCHMBMS Point-to-multipoint Control CHannel
MCE MBMS coordinating entity
MCH Multicast channel
MRW Move Receiving Window
MSB Most Significant Bit
MSCH MBMS control channel
MSCH MBMS Point-to-multipoint Scheduling CHannel
MTCH MBMS Point-to-multipoint Traffic CHannel
PCCH Paging Control CHannel
PCH Paging CHannel
PDCCH Physical downlink control channel
PDSCH Physical downlink shared channel
PDU Protocol Data Unit
PHY PHYsical layer
PhyCH Physical Channels
RACH Random Access Channel
RAT Radio Access Technology
RLC Radio Link Control
RRC Radio Resource Control
SAP Service Access Point
SDU Service Data Unit
SHCCH SHared channel Control CHannel
SN Sequence Number
SUFI SUper FIeld
TCH Traffic CHannel
TDD Time Division Duplex
TFI Transport Format Indicator
TM Transparent Mode
TMD Transparent Mode Data
TTI Transmission Time Interval
U- User-
UE User Equipment
UL UpLink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network FIG. 2 illustrates a block diagram of an exemplary communication system that may accommodate the various embodiments. The MIMO communication system 200 that is depicted in FIG. 2 comprises a transmitter system 210 (e.g., a base station or access point) and a receiver system 250 (e.g., an access terminal, communication device, user equipment, etc.) in a MIMO communication system 200. It will be appreciated by one of ordinary skill that even though the base station is referred to as a transmitter system 210 and a communication device is referred to as a receiver system 250, as illustrated, embodiments of these systems are capable of bi-directional communications. In that regard, the terms "transmitter system 210" and "receiver system 250" should not be used to imply single directional communications from either system. At the transmitter system 210, traffic data for a number of data streams is provided from a data source 212 to a transmit (TX) data processor 214. Each data stream may be transmitted over a respective transmitter system. The TX data processor 214 formats, codes, and interleaves the traffic data for each data stream, based on a particular coding scheme selected for that data stream, to provide the coded data.

The coded data for each data stream may be multiplexed with pilot data using, for example, OFDM techniques. The pilot data is typically a known data pattern that is processed in a known manner and may be used at the receiver system to estimate the channel response. The multiplexed pilot and coded data for each data stream is then modulated (symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 230 of the transmitter system 210.

In the exemplary block diagram of FIG. 2, the modulation symbols for all data streams may be provided to a TX MIMO processor 220, which can further process the modulation symbols (e.g., for OFDM). The TX MIMO processor 220 then provides $N_T$ modulation symbol streams to $N_T$ transmitter system transceivers (TMTR) 222a through 222t. In one example, the TX MIMO processor 220 may further apply beamforming weights to the symbols of the data streams and to the antenna from which the symbol is being transmitted.

Each transmitter system transceiver 222a through 222t receives and processes a respective symbol stream to provide one or more analog signals, and further condition the analog signals to provide a modulated signal suitable for transmission over the MIMO channel. In some embodiments, the conditioning may include, but is not limited to, operations such as amplification, filtering, up-conversion and the like. The modulated signals produced by the transmitter system transceivers 222a through 222t are then transmitted from the transmitter system antennas 224a through 224t that are shown in FIG. 2.

At the receiver system 250, the transmitted modulated signals may be received by the receiver system antennas 252a through 252r, and the received signal from each of the receiver system antennas 252a through 252r is provided to a respective receiver system transceiver (RCVR) 254a through 254r. Each receiver system transceiver 254a through 254r conditions a respective received signal, digitizes the conditioned signal to provide samples, and may further processes the samples to provide a corresponding "received" symbol stream. In some embodiments, the conditioning may include, but is not limited to, operations such as amplification, filtering, down-conversion and the like.

An RX data processor 260 then receives and processes the symbol streams from the receiver system transceivers 254a through 254r based on a particular receiver processing technique to provide a plurality of "detected" symbol streams. In one example, each detected symbol stream can include symbols that are estimates of the symbols transmitted for the corresponding data stream. The RX data processor 260 then, at least in part, demodulates, de-interleaves, and decodes each detected symbol stream to recover the traffic data for the corresponding data stream. The processing by the RX data processor 260 may be complementary to that performed by the TX MIMO processor 220 and the TX data processor 214 at the transmitter system 210. The RX data processor 260 can additionally provide processed symbol streams to a data sink 264.

In some embodiments, the channel response estimate generated by the RX data processor 260 can be used to perform space/time processing at the receiver system 250, adjust power levels, change modulation rates or schemes, and/or other appropriate actions. Additionally, the RX data processor 260 can further estimate channel characteristics such as, signal-to-noise (SNR) and signal-to-interference ratio (SIR) of the detected symbol streams. The RX data processor 260 can then provide estimated channel characteristics to a processor 270. In one example, the RX data processor 260 and/or the processor 270 of the receiver system 250 can further derive an estimate of the "operating" SNR for the system. The processor 270 of the receiver system 250 can also provide channel state information (CSI), which may include information regarding the communication link and/or the received data stream. This information, which may contain, for example, the operating SNR and other channel information, may be used by the transmitter system 210 (e.g., base station or eNodeB) to make proper decisions regarding, for example, the communication device scheduling, MIMO settings, modulation and coding choices and the like. At the receiver system 250, the CSI that is produced by the processer 270 is processed by a TX data processor 238, modulated by a modulator 280, conditioned by the receiver system transceivers 254a through 254r, and transmitted back to the transmitter system 210. In addition, a data source 236 at the receiver system 250 can provide additional data to be processed by the TX data processor 238.

In some embodiments, the processor 270 at the receiver system 250 may also periodically determine which pre-coding matrix to use. The processor 270 formulates a reverse link message comprising a matrix index portion and a rank value portion. The reverse link message may comprise various types of information regarding the communication link and/or the received data stream. The reverse link message is then processed by the TX data processor 238 at the receiver system 250, which may also receive traffic data for a number of data streams from the data source 236. The processed information is then modulated by a modulator 280, conditioned by one or more of the receiver system transceivers 254a through 254r, and transmitted back to the transmitter system 210.

In some embodiments of the MIMO communication system 200, the receiver system 250 is capable of receiving and processing spatially multiplexed signals. In these systems, spatial multiplexing occurs at the transmitter system 210 by multiplexing and transmitting different data streams on the transmitter system antennas 224a through 224t. This is in contrast to the use of transmit diversity schemes, where the same data stream is sent from multiple transmitter systems antennas 224a through 224t. In a MIMO communication system 200 capable of receiving and processing spatially multiplexed signals, a precode matrix is typically used at the transmitter system 210 to ensure the signals transmitted from each of the transmitter system antennas 224a through 224t are sufficiently decorrelated from each other. This decorrelation ensures that the composite signal arriving at any particular receiver system antenna 252a through 252r can be received and the individual data streams can be determined in the presence of signals carrying other data streams from other transmitter system antennas 224a through 224t.

Since the amount of cross-correlation between streams can be influenced by the environment, it is advantageous for the receiver system 250 to feed back information to the transmitter system 210 about the received signals. In these systems, both the transmitter system 210 and the receiver system 250 contain a codebook with a number of precode matrices. Each of these precode matrices can in some instances be related to an amount of cross-correlation experienced in the received signal. Since it is advantageous to send the index of a particular matrix rather than the values in the matrix, the feedback control signal sent from the receiver system 250 to the transmitter system 210 typically contains the index of a particular precode matrix. In some instances the feedback control signal also includes a rank index which indicates to the transmitter system 210 how many independent data streams to use in spatial multiplexing.

Other embodiments of MIMO system communication 200 are configured to utilize transmit diversity schemes instead of the spatially multiplexed scheme described above. In these embodiments, the same data stream is transmitted across the transmitter system antennas 224a through 224t. In these embodiments, the data rate delivered to receiver system 250 is typically lower than spatially multiplexed MIMO communication systems 200. There are advantages to these embodiments in terms of robustness and reliability of the communication channel. In transmit diversity systems each of the signals transmitted from the transmitter system antennas 224a through 224t will experience a different interference environment (fading, reflection, multi-path phase shifts). In these embodiments, the different signal characteristics received at the receiver system antennas 252a through 254r are useful in determining the appropriate data stream. In these embodiments, the rank indicator is typically set to 1, telling the transmitter system 210 not to use spatial multiplexing.

Other embodiments may utilize a combination of spatial multiplexing and transmit diversity. For example in a MIMO communication system 200 utilizing four transmitter system antennas 224a through 224t, a first data stream may be transmitted on two of the transmitter system antennas 224a through 224t and a second data stream transmitted on remaining two transmitter system antennas 224a through 224t. In these embodiments, the rank index is set to an integer lower than the full rank of the precode matrix, indicating to the transmitter system 210 to employ a combination of spatial multiplexing and transmit diversity.

At the transmitter system 210, the modulated signals from the receiver system 250 are received by the transmitter system antennas 224a through 224t are conditioned by the transmitter system transceivers 222a through 222t, are demodulated by a transmitter system demodulator 240, and are processed by the RX data processor 242 to extract the reserve link message transmitted by the receiver system 250. In some embodiments, the processor 230 of the transmitter system 210 then determines which pre-coding matrix to use for future forward link transmissions, and then processes the extracted message. In other embodiments, the processor 230 uses the received signal to adjust the beamforming weights for future forward link transmissions.

In other embodiments, a reported CSI can be provided to the processor 230 of the transmitter system 210 and used to determine, for example, data rates as well as coding and modulation schemes to be used for one or more data streams. The determined coding and modulation schemes can then be provided to one or more transmitter system transceivers 222a through 222t at the transmitter system 210 for quantization and/or use in later transmissions to the receiver system 250. Additionally and/or alternatively, the reported CSI can be used by the processor 230 of the transmitter system 210 to generate various controls for the TX data processor 214 and the TX MIMO processor 220. In one example, the CSI and/or other information processed by the RX data processor 242 of the transmitter system 210 can be provided to a data sink 244.

In some embodiments, the processor 230 at the transmitter system 210 and the processor 270 at the receiver system 250 may direct operations at their respective systems. Additionally, a memory 232 at the transmitter system 210 and a memory 272 at the receiver system 250 can provide storage for program codes and data used by the transmitter system processor 230 and the receiver system processor 270, respectively. Further, at the receiver system 250, various processing techniques can be used to process the $N_R$ received signals to detect the $N_T$ transmitted symbol streams. These receiver processing techniques can include spatial and space-time receiver processing techniques, which can include equalization techniques, "successive nulling/equalization and interference cancellation" receiver processing techniques, and/or "successive interference cancellation" or "successive cancellation" receiver processing techniques.

As noted earlier, mobility of a communication device between different radio resources may be needed in order to, for example, take advantage of a variety of services that are available through other radio access technologies. A non-exhaustive list of such technologies include UMTS, GSM, 3GPP WCDMA and LTE, 3GPP2 1xRTT and HRPD, as well as WLAN, WiMAX and fixed access technologies such as DSL and passive optical network (PON) or cable. As such, a current network may direct a communication device to seek services on another RAT and provides information to guide the communication device in its search for an appropriate serving cell on the target RAT. However, in the absence of an appropriate redirect failure recovery procedure, a failed redirect attempt may cause the communication device to return to the original network, which may again be redirected to the same network that caused the failure. This ping-pong action may continue indefinitely, or for a long time, thus preventing the communication device from acquiring the desired resources. A similar scenario can also occur when a communication device is redirected to acquire a different set of radio resources within the same network and/or radio access technology. It is to be understood that the term "radio resources" may refer to any portion of a resource or resources that may be needed for acquisition of a service in a communication network. Non-exhaustive examples of radio resources include a network, a RAT, a frequency band, a carrier, a time slot, one or more physical, transport, and/or logical channels, or combinations thereof. To facilitate the understanding the disclosed embodiments, the term "source set of radio resources" will be used to refer to some or all of the radio resources that are allocated to a communication device but are either already de-allocated or must be de-allocated from the communication device. Similarly, the term "target set of radio resources" will be used to refer to the radio resources that are to be acquired by the communication device.

Figure 3:
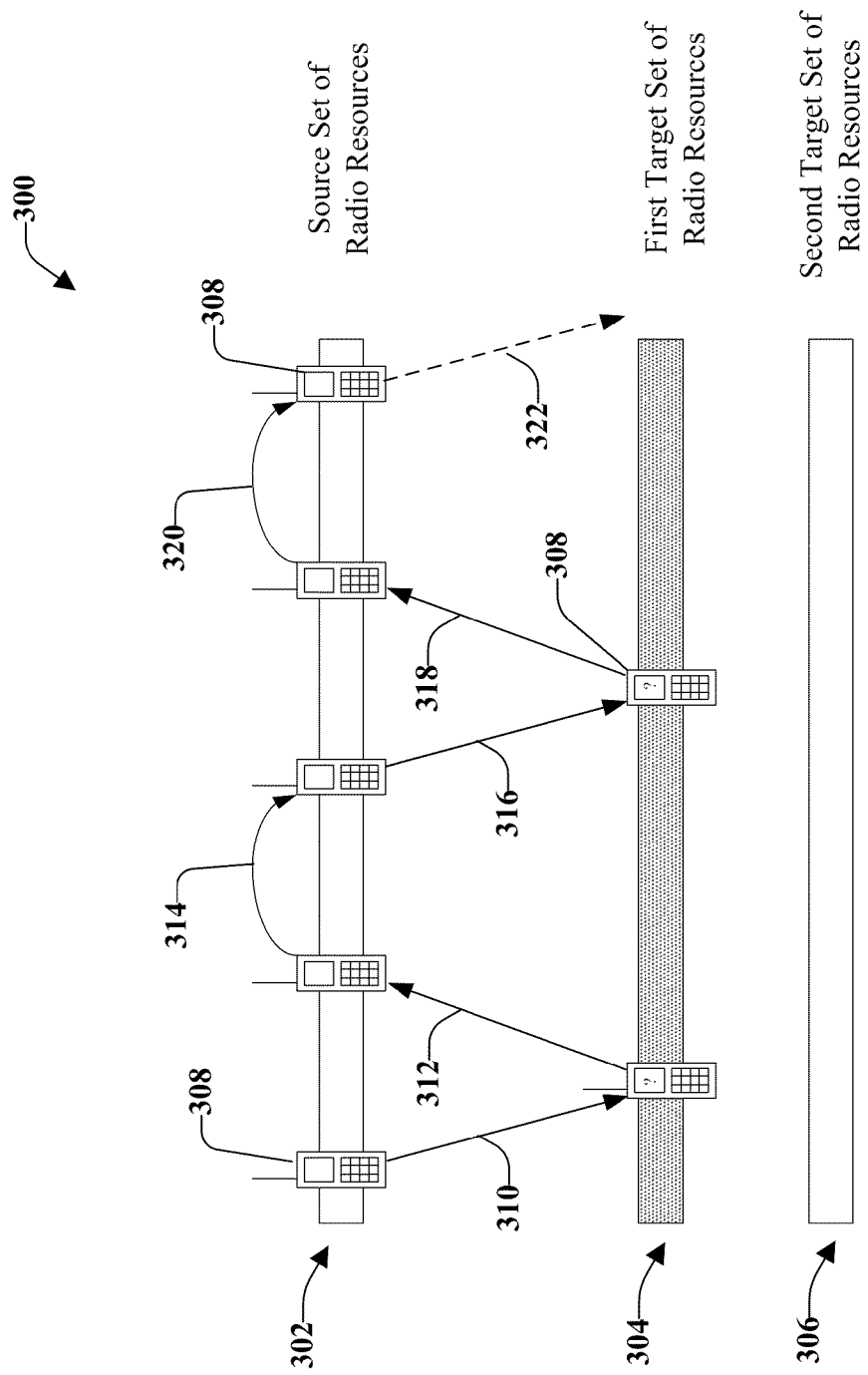
FIG. 3 illustrates a disclosed system where for carrying out preferential search for resources.

FIG. 3 illustrates a schematic representation of a ping-pong effect in which a communication device repeatedly returns to a last known "good" radio resources (e.g., the last good carrier). The schematic representation of FIG. 3 is described in the context of a communication device (e.g., the receiver system 250 of FIG. 2) that is initially connected to an LTE network base station (e.g., the transmitter system 210 of FIG. 2). However, it is understood that the various disclosed embodiments are also applicable to other networks and systems. FIG. 3 illustrates three sets of radio resources along the horizontal access. These radio resources are: a source set of radio resources 302 (e.g., an LTE radio resource), a first target set of radio resources 304, which for purposes of this illustration is unavailable, and a second target set of radio resources 306. The LTE network associated with the source set of radio resources 302 may, for example, release a communication device 308 from connected mode through a procedure called "connection release with redirection," which is illustrated in FIG. 3 by an arrow 310 that points from the source set of radio resources 302 to the first target set of radio resources 304. Connection release with redirection directs the communication device 308 to release its current Radio Resource Control (RRC) connection and move to the first target set of radio resources 304 (e.g., a different carrier) to camp in idle mode. In some embodiments, the first target set of radio resources 304 may be part of the LTE system (e.g., if the network is attempting to keep its camping load balanced across frequencies) or part of a different RAT (e.g., UMTS, GSM, 1xRTT, HRPD, and the like).

A redirection attempt may also be triggered through a circuit switched (CS) fallback procedure, which could be initiated from, for example, an LTE network with a handover or a cell change order. As noted earlier, CS fallback allows a subscriber to transition to a circuit network to obtain certain services that are not available on its current network. For example, a communication device may be directed from an original LTE system that does not support VoIP to a CS-capable RAT in order to obtain voice services in the CS domain instead. A handover typically refers to a cell transition that occurs when a radio resource control (RRC) connection is in place. Handovers can only be initiated by the network. During a handover, the network sends the communication device a handover command, which provides information about the destination cell. Cell reselection, on the other hand, refers to the process of changing the communication device's serving cell either in idle mode or while actively transmitting data. Cell reselections can be initiated by the communication device or the network. When the network initiates a cell reselection, the network typically sends a cell change order, which provides the parameters necessary for the communication device to find and transition to the target cell.

As a result of a CS fallback procedure the communication device 308 that is depicted in FIG. 3 may be directed to move onto the first target set of radio resources 304 and attempt to obtain services. As noted earlier, the term "redirection procedure" is used throughout this description to convey any procedure in which a network directs a communication device to seek certain target radio resources on another RAT, and in some cases, within the same RAT. The redirection procedure often includes information to guide the communication device 308 in its search for an appropriate serving cell on a target carrier.

Failure handling procedures are often in place to accommodate a communication device's failure to obtain the proper resources on a target system. While these procedures vary, traditional failure handling procedures tend to bring the communication device 308 back to the original system that provided the source set of radio resources 302 to, for example, utilize the original carrier for obtaining the desired services. This operation, also known as return to last known good carrier, is illustrated, for example, by the arrow 312 in FIG. 3 that points from the first target set of radio resources 304 to the source set of radio resources 302. In a connected-mode CS fallback procedure, the failure handling procedure may direct the communication device 308 to revert to the "source configuration" and perform connection reestablishment on the LTE system that provided the source set of radio resources 302. The connection reestablishment operation is illustrated, for example, by an arrow 314 in FIG. 3 that originates from and terminates on the communication device 308 on the source set of radio resources 302.

In the case of connection release with redirection, if the communication device 308 is unable to camp on the first target set of radio resources 304 (e.g., a target carrier), the communication device 308 is directed to perform "stored information cell selection" on the target set of radio resources 304. In particular, in 3GPP RATs, the "stored information cell selection" procedure is defined but specified in an intentionally permissive manner. As such, there is significant leeway to choose a method for discovering cells on which the communication device 308 can camp, as well as for selecting a particular cell for this purpose. In the case of inter-RAT redirection, however, some communication device implementations may encounter problems in dealing with redirect failures as described in detail in the sections that follow.

In order to speed up the cell selection process, stored information for several target set of radio resources may be available in the communication device 308. The "stored information cell selection" procedure uses the stored information, such as carrier frequencies and other parameters, that is accessible to the communication device 308 related to previously used radio resources on particular cells. However, if the "stored information cell selection," as implemented in a particular communication device 308, tends to "prefer" directing the communication device 308 back to the source (i.e., original) set of radio resources 302 (e.g., the original cell, frequency, or RAT) where service was most recently available, the communication device 308 will migrate back to the same source set of radio resources 302 from which communication device 308 was just redirected. These operations are illustrated by the arrow 316 that originates from the source set of radio resources 302 to the first target set of radio resources 304 (e.g., connection release with redirection), the arrow 318 that points from the first target set of radio resources 304 to the source set of radio resources 302 (e.g., return to last known good carrier), and the arrow 320 that originates from and terminates on the communication device 308 on the source set of radio resources 302 (e.g., connection reestablishment). Upon a failure to procure the first target set of radio resources 304, the communication device 308 may need to register for reconnection to the network that provided the source set of radio resources 302 (i.e., return to RRC_CONNECTED state to register). The registration for connection may be needed since the original network that provided the source set of radio resources 302 (e.g., the LTE system) may think that the communication device 308 has gone elsewhere. The communication device 308 is likely to then be redirected again, potentially causing a ping-pong action, as illustrated by the dashed arrow 322 in FIG. 3 that originates from the communication device 308 on the source set of radio resources 302. It should be noted that instead of a ping-pong action, where the communication device 308 is bounced back and forth between the source set of radio resources 302 and the first target set of radio resources 304, similar problems arise when the communication device 308 is subject to one (or more) "pings." In this scenario, the communication device 308 is unable to locate either the first target set of radio resources 304 or the source set of radio resources 302 as a result of one or more redirection failures.

FIG. 3 also illustrates a second target set of radio resources 306, where the communication device 308 would be able to obtain services. However, in the exemplary representation of FIG. 3, the communication device 308 never gets the opportunity to discover the second target set of radio resources 306 since the "return to the last good carrier" heuristic keeps sending the communication device 308 back to the source set of radio resources 302.

A similar ping-pong effect may result if the communication device 308 is configured to depend on its internal list of radio resource, such as frequency and RAT, priorities to determine a suitable cell to camp on. In such a case, the communication device 308 can also find itself repeatedly returning to the original network and/or the source set of radio resources upon its failure to procure the appropriate target set of radio resources. In an example scenario, where the original redirect is initiated from an LTE network, the behavior of the communication device 308 depends on whether or not the communication device 308 is actually instructed to prioritize LTE frequencies above other frequencies. However, for a communication device 308 that was most recently connected on an LTE system, it is reasonably likely that the LTE network is given a relatively high priority by the communication device 308.

The above-described ping-pong scenarios are undesirable since, at the very least, they delay the acquisition of the radio resources needed by a communication device 308. Even worse, if the redirection was performed to direct the communication device 308 to a RAT that offers a particular service (e.g., a user is redirected from an LTE system to a CS-capable RAT that supports VoIP), the user may be unable to obtain that desired service until the loop is broken and the communication device 308 somehow manages to select a frequency on the target RAT.

A similar ping-pong effect may be produced as a result of a CS fallback procedure, where the communication device 308 is transferred from an first network (e.g., E-UTRAN) to another RAT that supports CS services, through a handover or cell change order procedure. In case of a CS fallback failure, if the communication device 308 is configured to revert to the configuration of the originating network, the communication device 308 initiates an RRC connection re-establishment procedure and performs cell selection. As noted earlier, a natural implementation may be to direct the user to return to the source set of radio resources (e.g., frequency and/or RAT, such as E-UTRAN) in case of a failure. Since the CS fallback procedure was intended to transfer the communication device 308 to a different RAT, it is likely that the original RRC connection had been released by the network, thus causing the connection re-establishment procedure to fail and placing the communication device 308 in idle mode. In this case, the communication device 308 may re-initiate the CS service request, where the entire CS fallback procedure must be replicated, possibly with the same or a similar unproductive results.

Various disclosed embodiments relate to methods, devices and computer programs products that enable a preferential search of additional radio resources and eliminate and/or reduce the ping-pong effects that prevent a communication device 308 from obtaining the proper radio resources. According to one embodiment, a communication device 308 does not return to a source system and/or a source set of radio resources unless there is a failure of the preferential search.

Figure 4:
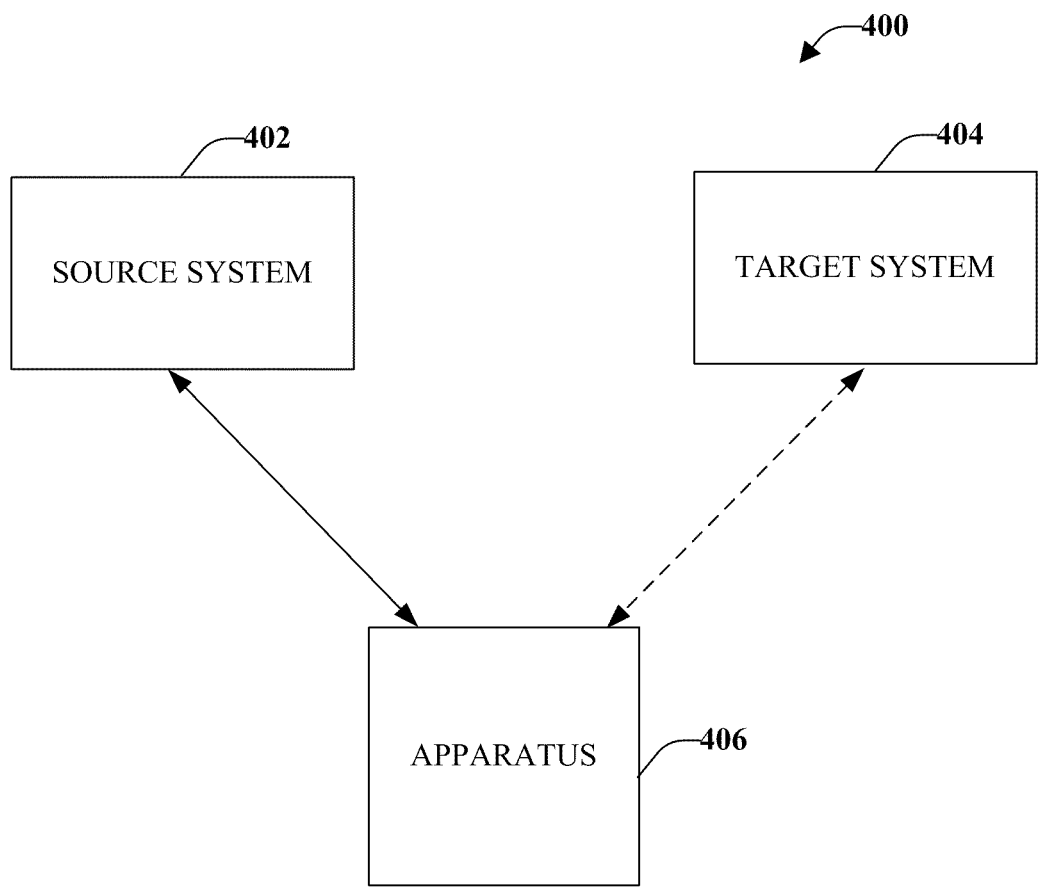
FIG. 4 illustrates a schematic representation of a ping-pong effect that is associated with a communication network.

FIG. 4 illustrates a system 400 that mitigates the ping-pong and denial of service effects in accordance with the various provided embodiments. The system 400 is configured to override and/or augment general rules governing radio resource selection in order to perform a preferential search of other carriers, or more generally, additional radio resources. The additional radio resources may be associated with an original target set of radio resources, or may be part of a different system (e.g., RAT, network, etc.) than the target set of radio resources. The system 400 comprises a source system 402 and a target system 404. The source system 402 can be, for example, an LTE system and the target system 404 can be, for example, another RAT. An apparatus 406 that is utilizing and/or is assigned to use various radio resources of the source system 402 may be directed from the source system 402 to the target system 404 by any one of several procedures. In some embodiments, these procedures include, but not limited to, transfer procedures associated with redirection, handovers and cell change orders. When the apparatus 406 is not able to acquire the desired services or resources on the target system 404, the apparatus 406 is configured to intelligently handle these transfer situations according to the disclosed embodiments. As noted earlier, the source system 402 and the target system 404 may represent different set of radio resources within the same or different systems.

Some of the disclosed embodiments are described with reference to redirection from an LTE system to another RAT for purposes of explanation. Further, LTE-related terms are used throughout this specification to facilitate the understanding of the exemplary embodiments. However, the disclosed embodiments are not limited to LTE and RAT, and the general behavior, as disclosed herein, is applicable to any mobility related activity that includes directing a user (e.g., communication device and/or user equipment) with directions to acquire certain target radio resources within or outside of an original system. The redirection may be, for example, to a particular cell, frequency or other resources on a target system 404.

Referring back to FIG. 4, the apparatus 406 is configured to recover from failure due to a redirection, handover, or cell change order procedure from a source set of radio resources (e.g., resources associated with the source system 402) to a target set of radio resources (e.g., resources associated with the target system 404). The target set of radio resources can be different from the source set of radio resources. In accordance with an exemplary embodiment, the target set of radio resources is specified when the apparatus 406 is directed to transfer from the source system 402. In some situations, the apparatus 406 may determine that the desired service cannot be obtained on the target set of radio resources associated with the target system 404. Based on this determination, the apparatus 406 may preferentially search additional radio resources that may be in an association with the target resources before searching for services elsewhere. This preferential search may be conducted at least in-part based on the cause of redirection. In accordance with another example embodiment, the apparatus 406 may exclude the source set of radio resources from the search for a variable period after a redirection, handover, or cell change order procedure is triggered.

Figure 5:
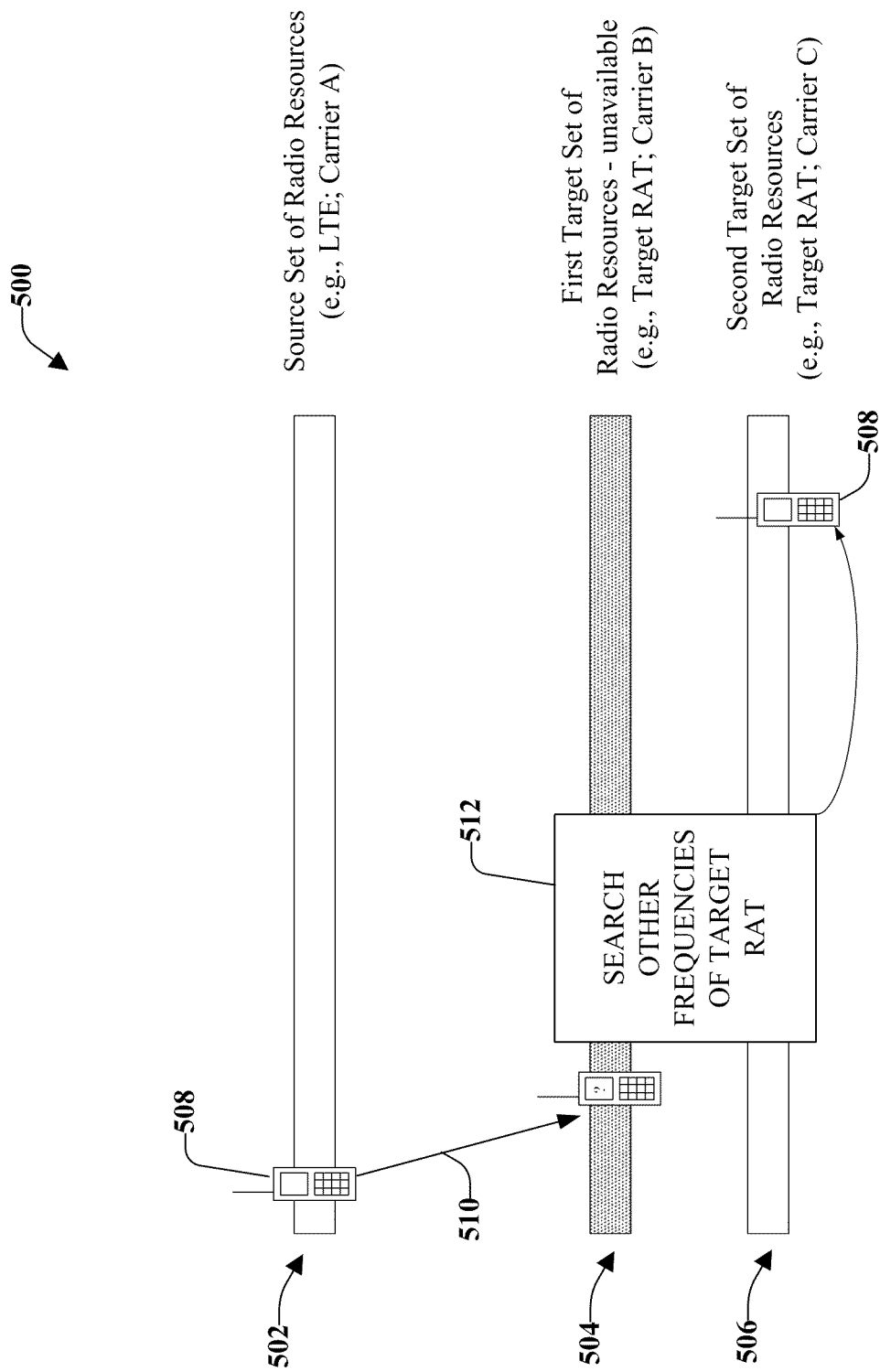
FIG. 5 illustrates an example schematic representation for preferential search of resources associated with a radio access technology.

FIG. 5 illustrates a system 500 that allows preferential search for a target system (e.g., the target system 404 of FIG. 4) in accordance with the disclosed embodiments. In the exemplary diagram of FIG. 5, the system 500 is capable of intelligently handling the situation where a communication device 508 is transferred from a source system 502 (e.g., the source system 402 of FIG. 4) to a target system 504 (e.g., the target system 404 of FIG. 4), after the communication device 508 has failed to acquire the desired services, for example, on the frequency or cell of the target system 504. The system 500 that is illustrated in FIG. 5 can mitigate the ping-pong effect that was previously described in connection with FIG. 3.

The exemplary system 500 of FIG. 5 illustrates three sets of radio resources: a source set of radio resources 502 (e.g., an LTE carrier A), a first target set of radio resources 504 (e.g., a target RAT carrier B), which for purposes of this illustration is unavailable to the communication device 508, and a second target set of radio resources 506 (e.g., RAT carrier C). It should be noted that the second target set of radio resources 506 may represent radio resources on an entirely different network than the one associated with the first target set of radio resources 504 and/or the source set of radio resources 502), or may represent a different resource (e.g., a frequency) on the same network or RAT as the one associated with the first target set of radio resources 504 and/or the source set of radio resources 502). A communication device 508 may be released from the source set of radio resources 502 with redirection (i.e., the communication device 508 is subject to a "connection release with redirection") as illustrated by the arrow 510 that points from source set of radio resources 502 to the first target set of radio resources 504. This operation is similar to one described earlier in connection with FIG. 3. However, in the exemplary scenario of FIG. 5, as part of the redirection procedure, the communication device 508 also "inherits" additional instructions 512 to, in case of a redirect failure, search for, for example, other frequencies of the target RAT before looking elsewhere. As such, the communication device 508, upon its initial failure to acquire the necessary services on the first target set of radio resources 504, conducts a preferential search for additional resources (e.g., other frequencies) in accordance with the provided instructions 512, thereby discovering the second target set of radio resources 506 that provides the appropriate service on the appropriate RAT.

It should be noted that the redirection procedure may be considered to be complete as soon as the communication device 508 "departs" from the source carrier and/or the source set of radio resources 502. The preferential search of other resources (e.g., other frequencies on the target RAT) can, therefore, be construed as an additional aspect of the redirection procedure. Alternatively or additionally, the preferential search procedure may be considered an aspect of how the communication device 508 chooses to implement the procedure for selecting the proper resources. For example, in UMTS cell selection procedure, the preferential search procedure may be an aspect of how a particular communication device 508 chooses to implemented the "stored information cell selection" (or similar) process on the target system.

As noted earlier, the departure of a communication device 508 from a source system may be attributed to different procedures that include, but not are limited to, redirection, handover and cell change order. In accordance with the various disclosed embodiments, a communication device 508 is fully aware of the cause of the redirection procedure, and is, therefore, able to make intelligent decisions regarding the specific steps that are tailored for the specific triggering cause. For example, a communication device 508 in a CS fallback procedure may exhaust not only the original target RAT, but all available RATs that may provide the communication device 508 with the proper CS service, before returning to the source system. Such a preferential search/selection of target resources based on the redirection cause can be illustrated by reference to the example diagram of FIG. 5, in which the communication device 508 may depart the source set of radio resources 502 with different triggering messages that identify the cause of the departure. This is useful in the case of emergency calls, where any voice service at all is strongly preferred over a failed connection, and CS-capable RATs are often required to offer services even to non-subscribed communication device 508. Knowing that an emergency call is the triggering cause of the redirection, a communication device 508 may conduct a preferential search of all available RATs in pursuit of the resources necessary for making the emergency call. As such, the communication device 508 has the discretion as to whether or not apply the "target preference" based on the cause of the redirection and/or the original connection attempt. For example, the disclosed embodiments may be applicable to a scenario where the redirection is caused by CS fallback. Such a scenario may imply that the communication device prefers to conduct an extensive search for other radio resources to obtain voice service. In another example, the disclosed embodiments may be applied to a scenario in which the original connection attempt was conducted to place an emergency call. In this scenario, the communication device may also decide to conduct an extensive search for radio resources to obtain voice services for conducting the emergency call. It should be noted that the preferential search for other radio resources may be carried out in accordance with a list of radio resources that are arranged in a specific manner. For example, the listing may identify a number of frequencies that are ranked in a preferential order, with different frequencies potentially belonging to different RATs.

In view of the exemplary systems shown and described above, methodologies that may be implemented in accordance with the disclosed subject matter, will be better appreciated with reference to flow charts that follow. While, for purposes of simplicity of explanation, the methodologies are shown and described as a series of blocks, it is to be understood and appreciated that the disclosed embodiments are not limited by the number or order of blocks, as some blocks may occur in different orders and/or at substantially the same time with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g. device, system, process, component). Additionally, it should be further appreciated that the methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 6:
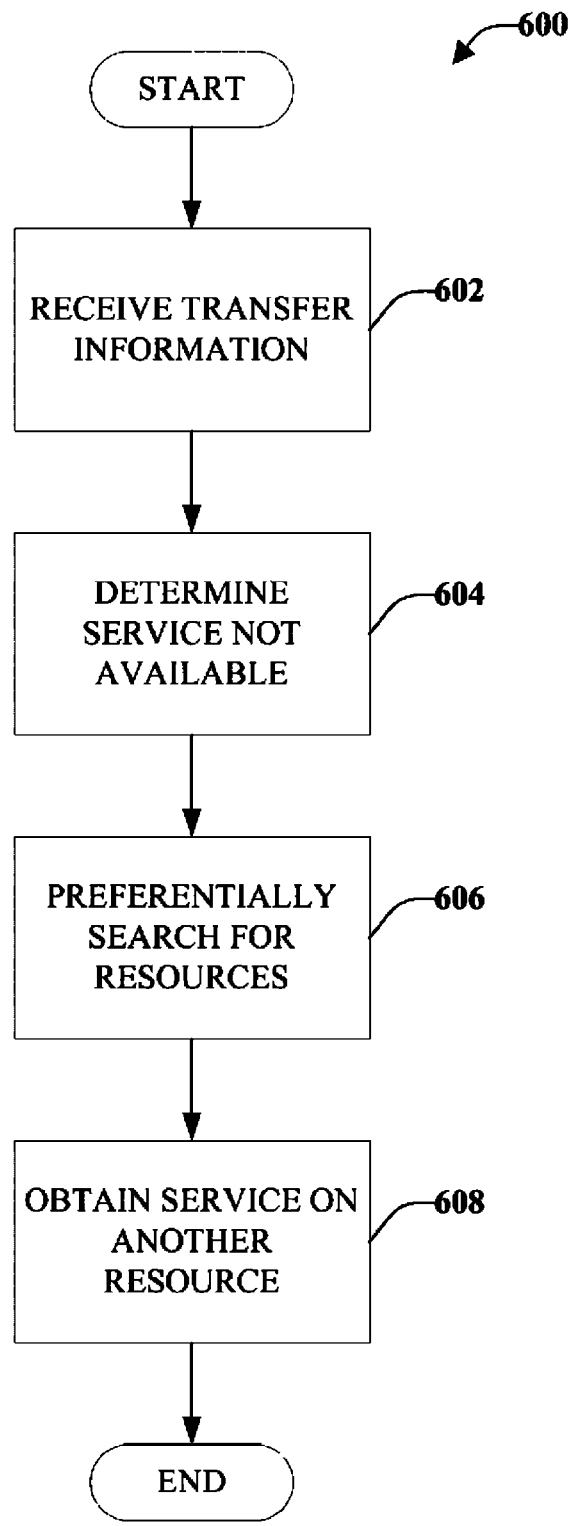
FIG. 6 illustrates a block diagram representing a disclosed method for conducting a preferential search for resources.

FIG. 6 illustrates a method 600 for recovering from failure of a redirection procedure such as a handover, cell change order procedure or redirection from a source set of radio resources (e.g. 302 FIG. 3 and 502 FIG. 5) to a target set of radio resources (e.g. 304 and 306 FIG. 3 and 504 and 506 FIG. 5), according to an embodiment. The method 600 starts, at 602, when transfer information is received. The transfer information can be an instruction to move from a source set of radio resources to a target set of radio resources. The source set of radio resources (e.g. 302 FIG. 3 and 502 FIG. 5) can be a source system and the target set of radio resources can be a target system. Further, the target set of radio resources (e.g. 304 and 306 FIG. 3 and 504 and 506 FIG. 5), can be different from the source set and can be specified, such as in a transfer instruction.

Next, at 604, a determination is made that service is not available for the concerned communication device (e.g., 308 FIG. 3) on the target set of radio resources (e.g., the specified target set of resources, 304 and 306 FIG. 3 and 504 and 506 FIG. 5). As noted earlier, the term "service" as used in connection with FIG. 6, and throughout this specification, may comprise any operation that requires the use of radio resources in a communication network. For example, the term service may refer to services that are provided to a user of a wireless communication network, such as voice, data, video and other services, as well as services provided for maintenance and management of the wireless network, such as load balancing in a LTE network and the like. Referring back to FIG. 6, at 606, a preferential search of additional radio resources is performed. The additional radio resources can be in association with the target set of radio resources (e.g., a second set of target radio resources within the same target system). If the search does not discover other radio resources in association with the target resources (e.g. 304 and 306 FIG. 3 and 504 and 506 FIG. 5), the search of additional radio resources can be expanded for service elsewhere (e.g., on other networks, systems, RATs and the like). Finally, at 608, service is obtained from the additional radio resources associated with the target resources or the expanded resources (also referred to as "preferentially searched radio resources").

In accordance with a disclosed embodiment, the source set of radio resources (e.g. 302 FIG. 3 and 502 FIG. 5), is a carrier. The target set of radio resources (e.g. 304 and 306 FIG. 3 and 504 and 506 FIG. 5), can include part or all of a carrier different from the source carrier. In another embodiment, the target set of radio resources (e.g. 304 and 306 FIG. 3 and 504 and 506 FIG. 5), can be a carrier of a system using a radio access technology that is different from the radio access technology of the source set of radio resources (e.g. 302 FIG. 3 and 502 FIG. 5).

According to another embodiment, the association of the preferentially searched radio resources with the target set of resources (e.g. 304 and 306 FIG. 3 and 504 and 506 FIG. 5), comprises being associated with a similar radio access technology. In another variation, the association of the preferentially searched radio resources with the target set of resources (e.g. 304 and 306 FIG. 3 and 504 and 506 FIG. 5), comprises being associated with a radio access technology capable of offering a similar service that the communication device was directed to obtain from the target set of radio resources (e.g. 304 and 306 FIG. 3 and 504 and 506 FIG. 5).

In accordance with another embodiment, the preferentially searched radio resources are determined by the type of service sought by the communication device (e.g. 308 FIG. 3 and 508 FIG. 5). The services can include, but are not limited to, a voice call and/or a communication device (e.g. 308 FIG. 3 and 508 FIG. 5) terminated emergency call. In some embodiments, the services include a communication device (e.g. 308 FIG. 3 and 508 FIG. 5) originated emergency call. Further, the preferentially searched radio resources can be resources from a registered Public Land Mobile Network (PLMN), a non-registered PLMN, or combinations thereof. A registered PLMN is a PLMN on which the communication device has successfully registered its presence in a registration area (i.e., performed a location registration (LR)).

The communication device (e.g. 308 FIG. 3 and 508 FIG. 5) can determine whether to apply the preferential search method 600 for a particular redirection procedure. The determination can be based, at least in part, on a cause of redirection provided by the source network. In some embodiments, the determination can be based, at least in part, on the type of service for which the communication device (e.g. 308 FIG. 3 and 508 FIG. 5) requested an RRC connection. Further, the source technology or system can be excluded from the search for a variable period after a redirection, handover, or cell change order procedure was triggered. For example, the period of exclusion can be indicated by the network at redirection and/or defined by a timer whose value is indicated by the network.

Alternatively or additionally, the period of exclusion can be determined, at least in part, by the communication device (e.g. 308 FIG. 3 and 508 FIG. 5). For example, the period of exclusion can be determined, at least in part, by the duration of a user service sought by the communication device (e.g. 308 FIG. 3 and 508 FIG. 5) on the preferentially searched resources. Alternatively or additionally, the communication device's (e.g. 308 FIG. 3 and 508 FIG. 5) determination can be based, at least in part, on a cause of redirection. The criteria utilized to define the period of exclusion can be different for communication device (e.g. 308 FIG. 3 and 508 FIG. 5) originated and communication device (e.g. 308 FIG. 3 and 508 FIG. 5) terminated services. In one embodiment, the period of exclusion can be defined, at least in part, by a timer in the communication device (e.g. 308 FIG. 3 and 508 FIG. 5) terminated case and, at least in part, by termination of the call attempt in the communication device (e.g. 308 FIG. 3 and 508 FIG. 5) originated case. In some embodiments, the period of exclusion can be determined differently for communication device (e.g. 308 FIG. 3 and 508 FIG. 5) originated and communication device terminated services. Alternatively or additionally, the period of exclusion can be determined differently for an emergency call and a non-emergency call. The period of exclusion can also be defined by a timer whose value is determined, at least in part, by the communication device (e.g. 308 FIG. 3 and 508 FIG. 5).

Figure 7:
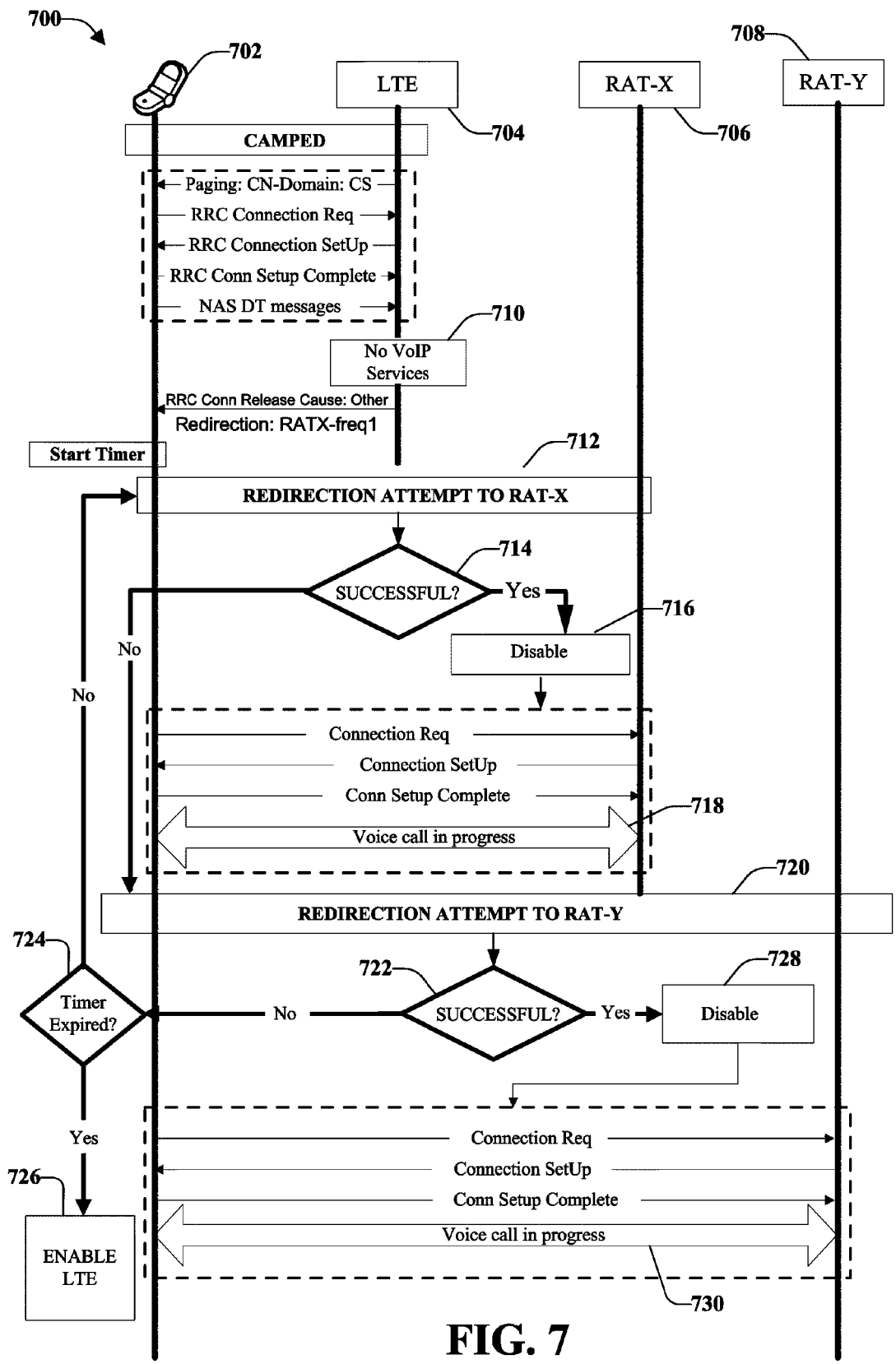
FIG. 7 illustrates a disclosed flow diagram for obtaining radio resources in a redirect procedure associated with a circuit switched fallback.

FIG. 7 illustrates a call flow or method 700 for redirection from an LTE system due to CS fallback, according to an example embodiment. Illustrated are a communication device 702, a first (or source) set of radio resources 704 (e.g., LTE), a second (or target) set of radio resources 706 (e.g., RAT-X), and a third set of radio resources 708 (e.g., RAT-Y). It should be understood that although in the exemplary flow diagram of FIG. 7 the communication device 702 is illustrated as a mobile phone, any communication device 702 can be utilized in accordance with the disclosed aspects, as well as other sets of radio resources than those shown and described herein. The call flow 700 of FIG. 7 illustrates the scenario where a communication device 702 is configured to handle an incoming CS call while on an radio resources 704.

As illustrated, communication device 702 is camped on the first set of radio resources 704. Various communications may occur between the first set of radio resources 704 (illustrated in FIG. 7 as LTE) and communication device 702. For example, "Paging: CN-Domain:CS" is sent from LTE to communication device 702. The communication device 702 sends a "RRC Connection Request" and the first set of radio resources 704 replies with a "RRC Connection Setup" and a "RRC Connection Setup Complete" message and "NAS DT" messages are sent by the communication device 702. Next, a determination is made, at 710, that there are no VoIP services available to handle the voice call. Thus, a "RRC Connection Release" is sent by the first set of radio resources 704, with a Redirection to the second set of radio resources 706. At this time, a timer may be initiated. The timer may be, for example, a countdown timer that counts down for T seconds.

At 712, a redirection attempt to a second set of radio resources 706 (illustrated in FIG. 7 as "RAT-X 706") is performed. This operation will be discussed shortly in further detail in connection with FIG. 9. Subsequent to a redirection attempt, a determination is made, at 714, at to whether or not the redirection was successful. If the redirection was successful ("YES"), the first set of radio resources 704 selection is disabled for the duration of the call, at 716. Various messages can be exchanged between second set of radio resources 706 and the communication device 702. Such messages include a Connection Request from the communication device 702. The second set of radio resources 706 may reply with a Connection Setup and the communication device 702 may reply with a Connection Setup Complete Message. At this point, the voice call is in progress, as indicated at 718.

If it is determined, at 714, that the redirection to the second set of radio resources 706 was not successful ("NO"), at 720, a redirection attempt to the third set of radio resources 708 (illustrated in FIG. 7 as "RAT-Y 708") is performed. At 722, a determination is made as to whether or not the redirection to the third set of radio resources 708 was successful. If redirection to the third set of radio resources 708 was not successful ("NO"), the method continues, at 724, and a determination is made as to whether or not the timer has expired (e.g., the timer count has reached zero). If the timer has not expired ("NO"), the method 700 continues, at 712, where another redirection attempt to second set of radio resources 706 is performed. If the determination, at 724, is that the timer has expired ("YES"), the method continues, at 726, where the communication device 702 is referred back to the first set of radio resources 704.

If the determination, at 722, is that the redirection to the third set of radio resources 708 is successful ("YES"), at 728, the first set of radio resources 704 system selection for duration of call is disabled and the method 700 continues with the communication device 702 and the third set of radio resources 708 exchanging messages (e.g., Connection Request, Connection Setup, Connection Setup Complete), followed by the progression of the voice call, at 730. It should be noted that while the exemplary diagram in FIG. 7 only illustrates the communication device's attempt to connect to the second set of radio resources 706 and the third set of radio resources 708, it is understood that in accordance with the disclosed principles, redirection attempts to more than, or fewer than, two RATs may be similarly carried out.

Figure 8:
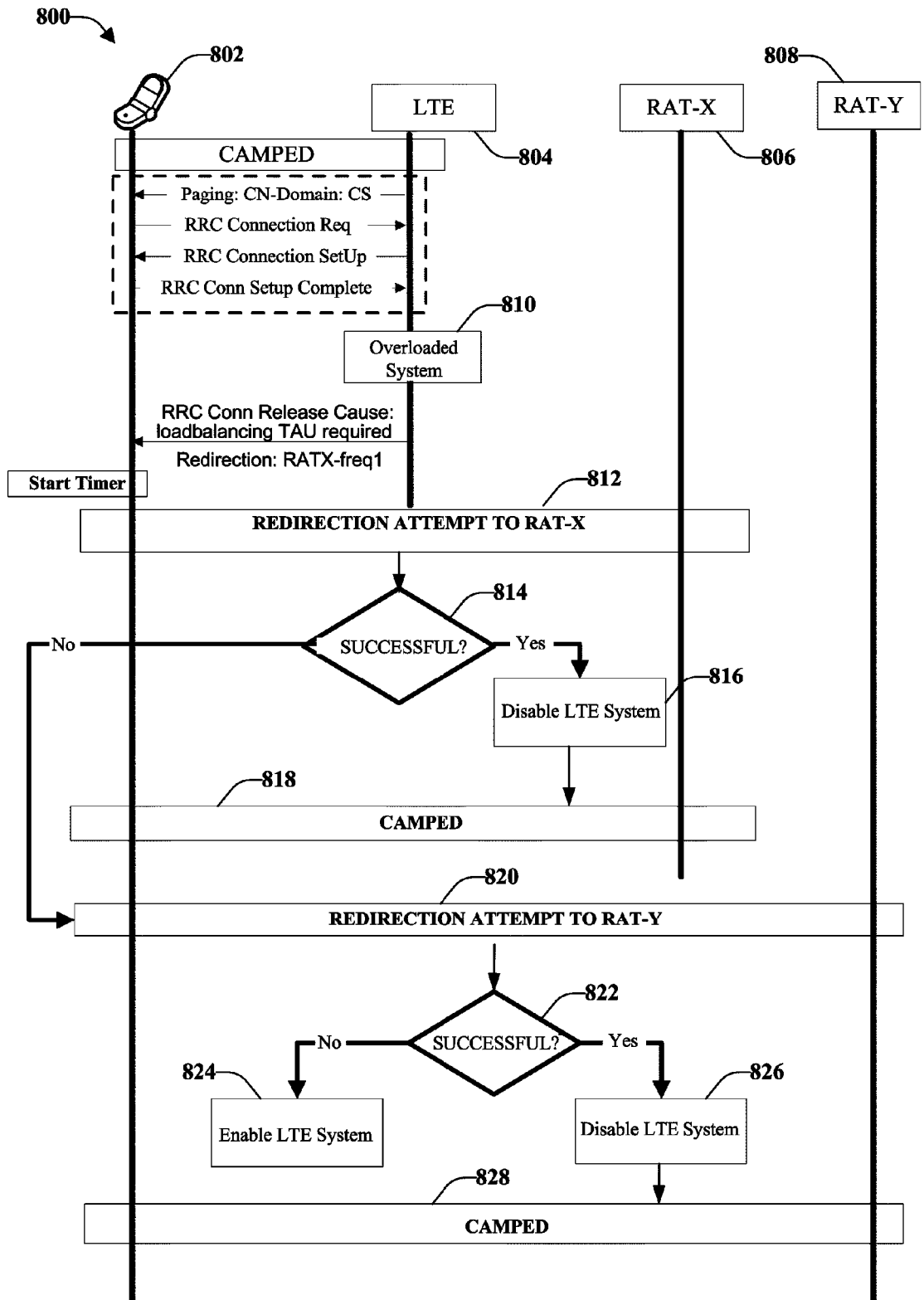
FIG. 8 illustrates another provided flow diagram for obtaining radio resources in a redirect procedure associated with load balancing.

FIG. 8 illustrates another exemplary method 800 for redirection from a first set of radio resources 804 (e.g., an LTE system) that is carried out for the purpose of load balancing in accordance with a disclosed embodiment. FIG. 8 illustrates the scenario where a communication device 802 is redirected from first set of radio resources 804 with the release cause as "load balancing tracking area update (TAU)." Load balancing in an LTE system is typically conducted to counteract local traffic load imbalance between neighboring cells in order to improve system capacity, whereas a tracking area update is preformed to update the registration information related to the communication device within a particular tracking area comprised of one or more cells. As noted earlier, the details related to the operation labeled as "redirection attempt to RAT-X/Y" will be described below with reference to FIG. 9.

FIG. 8 depicts a communication device 802, a first (or source) set of radio resources 804 (e.g., LTE), a second (or target) set of radio resources 806 (e.g., RAT-X), and a third set of radio resources 808 (e.g., RAT-Y). As discussed above, it should be understood that although FIG. 8 depicts a mobile phone, any communication device 802 can be utilized in accordance with the disclosed embodiments, as well as other sets of radio resources than those shown and described herein.

FIG. 8 illustrates a communication device 802 that is camped on the first set of radio resources 804 (illustrated on FIG. 8 as LTE) and various messages are exchanged between the first set of radio resources 804 and the communication device 802 (e.g., Paging: CN-Domain, CS; RRC Connection Request; RRC Connection Setup; and RRC Connection Setup Complete). At 810, a system overload occurs and a message is sent to the communication device 802 (e.g., "RRC Connection Release Cause: load balancing TAU required," and "Redirection: RAT-X frequency 1). Similar to the flow diagram of FIG. 7, at this point a timer for a duration of T seconds is initiated, at 810. As noted earlier in connection with the flow diagram of FIG. 7, this timer may be, for example, a countdown timer that counts down for T seconds.

At 812, a redirection attempt to the second set of radio resources 806 (illustrated in FIG. 8 as "RAT-X") is made and, at 814, a determination is made as to whether or not the redirection to the second set of radio resources 806 was successful. If the redirection attempt is successful ("YES"), at 816, the first set of radio resources 804 system selection is disabled for a wait period of, for example, T seconds, and the communication device 802 is camped on the second set of radio resources 806, at 818.

If it is determined, at 814, that the redirection to second set of radio resources 806 was not successful ("NO"), at 820, a redirection to the third set of radio resources 808 (illustrate in FIG. 8 as "RAT-Y") is attempted. At 822, a determination is made as to whether or not the redirection attempt to the third set of radio resources 808 was successful. If the redirection attempt to the third set of radio resources 808 was not successful ("NO"), at 824, the LTE 804 selection is enabled at the expiration of the wait timer (e.g., after T seconds). It should be noted that if the wait timer has not expired, another redirection attempt to any of the previously searched radio resources (e.g., first, second, or third set of radio resources) may be attempted. Alternatively, the wait timer may be allowed to expire earlier that the allotted T seconds so that the LTE 804 selection is enabled immediately. If the determination made, at 822, is that the redirection to the third set of radio resources 808 is successful ("YES"), at 826, the first set of radio resources 804 selection is disabled for the duration of the wait timer (e.g., for T seconds) and, at 828, the communication device 802 is camped on the third set of radio resources 808.

Figure 9:
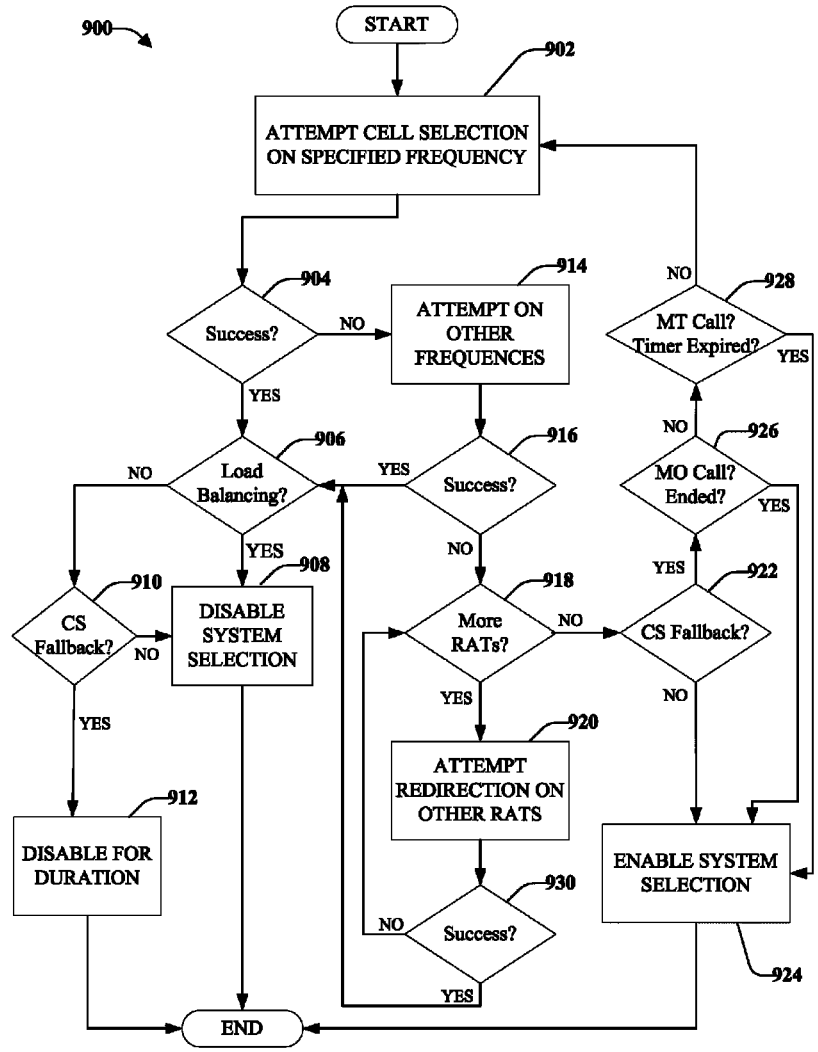
FIG. 9 illustrates a block diagram representing a method for processing a redirection instruction.

FIG. 9 illustrates a method 900 for processing a redirection attempt in accordance with a disclosed embodiment. The method 900 illustrates the exemplary steps that are carried out by a communication device (e.g. 308 FIG. 3, 508 FIG. 5, 702 FIG. 7) in response to receiving redirection instructions from the network, under various scenarios, including handovers and cell change orders. FIG. 9 also illustrates exemplary procedures related to an attempt of a communication device (e.g. 308 FIG. 3, 508 FIG. 5, 702 FIG. 7) originated (e.g., mobile-originated (MO)) CS call, attempt of an emergency call, reception of a communication device (e.g. 308 FIG. 3, 508 FIG. 5, 702 FIG. 7) terminated (e.g. mobile-terminated (MT)) CS call indication through paging and load balancing requirements. By the way of example, and not by limitation, the flow diagram of FIG. 9 may illustrate a communication device's response to the redirection attempts to the second and third set of radio resources 706, 708 that is carried out in FIG. 7 and FIG. 8, at 712 and 812, respectively.

The exemplary method 900 starts, at 902, when a cell selection on the frequency specified, for example, in the redirection information element (IE), for the second and/or third set of radio resources 706, 708 is attempted. At 904, a determination is made as to whether or not the cell selection on the specified frequency has succeeded. If successful ("YES"), the method 900 continues, at 906, with a determination as to whether or not the redirection cause was load balancing. If load balancing was the cause ("YES"), at 908, the first set of radio resources selection is disabled for the duration of a wait period duration (e.g., T seconds). The disabling of the first set of radio resources (804, FIG. 8) system selection for a load balancing scenario, at 908, is also depicted in FIG. 8, at 816 and 826.

If the determination, at 906, is that load balancing was not the cause of redirection ("NO"), at 910, a determination is made as to whether or not the redirection cause was a CS fallback. If CS fallback was not the cause ("NO"), the method 900 continues at 908, and the first set of radio resources system selection is disabled for the wait period (e.g., T seconds). If, on the other hand, it is determined, at 910, that CS fallback was the cause of redirection ("YES"), the method 900 continues, at 912, and the first set of radio resources system selection is disabled for the duration of the call. The disabling of the first set of radio resources 704 system selection for a CS fallback scenario for the duration of the call is also depicted in FIG. 7, at 716 and 728.

If the determination, at 904, was that the cell selection did not succeed on the specified frequency ("NO"), at 914, cell selection on other frequencies associated with the target set of resources (e.g., second and third sets of radio resources 706, 708) is attempted. At 916, a determination is made as to whether or not the cell selection at other frequencies was successful. If cell selection on at least one other frequency was successful ("YES"), the method 900 continues, at 906, where, as noted above, determination is made as to whether or not load balancing was the cause of redirection. If cell selection on other frequencies was not successful ("NO"), the method 900 continues, at 918, where a determination is made as to whether or not there are additional RATs on which a search for the radio resources can be carried out. If there are other RATs ("YES"), at 920, redirection is attempted on other RATs. It should be noted that this can be recursive such that any number of attempts can be made on other RATs, at 920. If a determination is made, at 930, that redirection attempts to another RAT was successful, the method 900 continues, at 906, by making the determination as to whether or not load balancing was the cause of redirection. Upon failure, at 930, to successfully redirect to another RAT, the method continues, at 918, to check for additional RATs. It should be noted that the method 900 may systematically make redirection attempts to additional RATs that are, for example, listed in a redirection message. Additionally, or alternatively, the method 900 may end before completing redirection attempts to all listed RATs if, for example, a period T associated with a wait timer has expired.

If the determination, at 918, indicates no additional RATs are present, ("NO"), at 922, a determination is made as to whether or not the redirection cause was CS fallback. If the cause of redirection was not CS fallback ("NO"), at 924, the LTE system selection is enabled once the wait timer period has expired (e.g., after T seconds). If the determination, at 922, indicates that the redirection cause was CS fallback, at 926, it is determined that if the call is a communication device (e.g. 308 FIG. 3, 508 FIG. 8, 702 FIG. 7) originated (hereinafter referred to a mobile-originated (MO) for purposes of simplicity) call, and if the user has ended the call. If the MO call has ended ("YES"), the method 900 continues, at 924, to enable the LTE system once the wait timer period has expired (e.g., after T seconds). If the call is not a communication device (e.g. 308 FIG. 3, 508 FIG. 8, 702 FIG. 7) originated call or if it has not ended ("NO"), at 928, the determination is made that if the call is a communication device (e.g. 308 FIG. 3, 508 FIG. 8, 702 FIG. 7) terminated (hereinafter referred to a mobile-terminated (MT) for purposes of simplicity) call, and if the wait time has expired. If the wait timer has expired and the call is an MT call ("YES"), the method 900 continues, at 924, where the first set of radio resources selection is enabled once the wait timer period has expired (e.g., after T seconds). If the determination, at 928, is that the timer has not expired or the call is not an MT call, the method 900 continues, at 902, to make a cell selection attempt. As evident from the exemplary method 900 that is illustrated in FIG. 9, MO and MT calls in a CS fallback procedure may be treated differently. In case of an MO call, the user (e.g., a communication device) is initiating the call, whereas an MT call corresponds to the situation where the user (e.g. a communication device) receives an incoming call. Similarly, while not specifically described in FIG. 9, further discrimination can be made based on the nature and urgency of the call. For example, an MO emergency call may be treated differently from other MO and/or MT calls.

Figure 10:
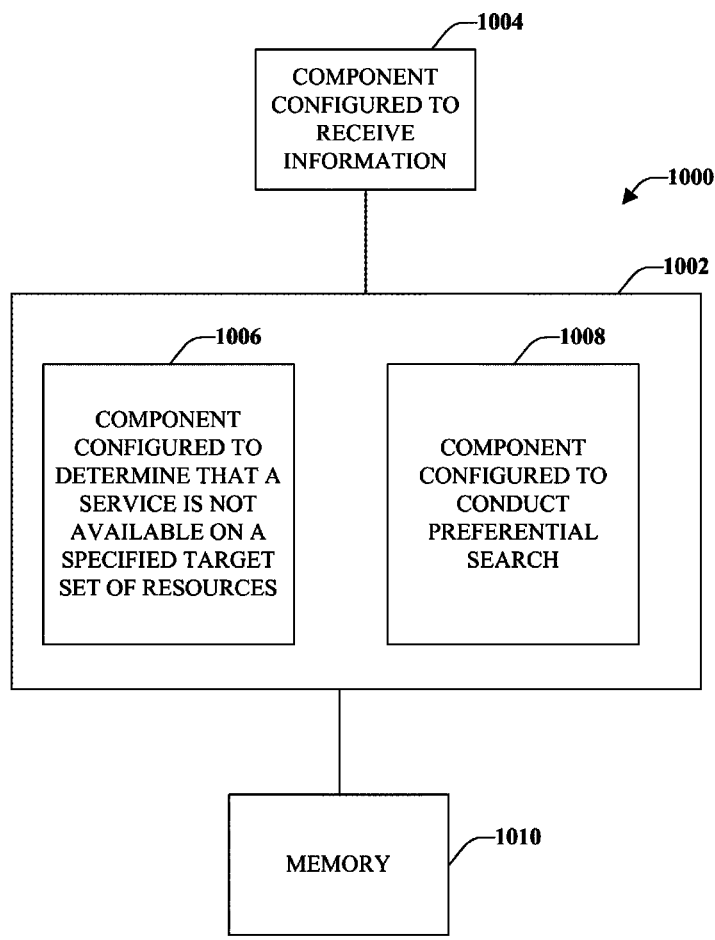
FIG. 10 illustrates another provided system that carries out a preferential search for resources.

FIG. 10, illustrates a system 1000 that recovers from a failure to acquire the resources from a first set of radio resources in accordance with the disclosed embodiments. The redirection may have been due to, for example, a handover, a cell change order procedure, or a redirection with connection release. The system 1000 can reside at least partially within a communication device (e.g. 308 FIG. 3, 508 FIG. 8, 702 FIG. 7). It is to be appreciated that system 1000 is represented as including functional blocks, which may be functional blocks that represent functions implemented by digital and/or analog circuitry, as well as by a processor, software, firmware, or combination thereof.

The system 1000 of FIG. 10 may include a component 1004 that is configured to receive information related to redirection of a communication device (e.g. 308 FIG. 3, 508 FIG. 8, 702 FIG. 7) for acquisition of a service on a target set of radio resources in a communication network. Such information may be received from a source set of radio resources as part of a redirection message. As noted earlier, the various components that are described in FIG. 10, and throughout this document, may be implemented in hardware, software, firmware, and combinations thereof. For example, the various components of system 1000 may be electrical components. The system 1000 of FIG. 10 also includes a logical grouping 1002 of components that can act separately or in conjunction. Logical grouping 1002 can include a component 1006 that is configured to determine that the service is not available on a specified target set of radio resources. The target set of radio resources can be specified by the source set of radio resources. Also included in logical grouping 1002 is a component 1008 that is configured to conduct a preferential search of additional radio resources (also referred to as "preferentially-searched radio resources"). The preferential search can constitute search for other radio resources that are in association with the target set of radio resources before searching for service elsewhere.

The association of the preferentially-searched radio resources with the target set of radio resources can consist of being associated with the same radio access technology. The association of the preferentially-searched radio resources with the target set of radio resources can consist of being associated with a radio access technology capable of offering the same service that the communication device was directed to obtain from the target set of radio resources. According to some embodiments, the preferentially-searched radio resources can be determined by the type of service sought by the communication device. For example, the service can comprise a voice call or a communication device terminated emergency call. The preferentially-searched radio resources can be those from the registered PLMN(s). According to other embodiments, the service comprises a communication device originated emergency call. The preferentially-searched radio resources are those from both the registered PLMN(s) and non-registered PLMN(s).

In some embodiments, logical grouping 1002 includes a component for determining whether to invoke a preferential search as a function of a particular redirection procedure. The determination can be based in part on a cause of redirection or on a type of service for which the communication device (e.g. 308 FIG. 3, 508 FIG. 8, 702 FIG. 7) requested an RRC connection.

The target set of radio resources can be a carrier. The target set of radio resources can also constitute part or all of a carrier different from the carriers associated with the source set of resources. In some embodiments, the target set of radio resources is a carrier of a system using a different radio access technology from the source set of radio resources.

In certain embodiments, the communication device (e.g. 308 FIG. 3, 508 FIG. 8, 702 FIG. 7) can determine whether to apply the method for a particular redirection procedure. The communication device's (e.g. 308 FIG. 3, 508 FIG. 8, 702 FIG. 7) determination is based at least in part on a cause of redirection provided by the network. Alternatively or additionally, the communication device's (e.g. 308 FIG. 3, 508 FIG. 8, 702 FIG. 7) determination can be based at least in part on the type of service for which the communication device (e.g. 308 FIG. 3, 508 FIG. 8, 702 FIG. 7) requested an RRC connection.

In some embodiments, the logical grouping 1002 can include a component for excluding the source set of resources from the search for a variable period after a redirection, handover, or cell change order procedure was triggered. The period of exclusion can be indicated, for example, by the network at redirection. The period of exclusion can be defined by a timer whose value is indicated by, for example, the network.

Alternatively or additionally, the period of exclusion is determined at least in part by the communication device (e.g. 308 FIG. 3, 508 FIG. 8, 702 FIG. 7). The period of exclusion can be determined at least in part by the duration of a user service sought by the communication device (e.g. 308 FIG. 3, 508 FIG. 8, 702 FIG. 7) on the preferentially-searched resources. The communication device's (e.g. 308 FIG. 3, 508 FIG. 8, 702 FIG. 7) determination can be based at least in part on a cause of redirection. The criteria used to define the period of exclusion can be different for communication device (e.g. 308 FIG. 3, 508 FIG. 8, 702 FIG. 7) originated and communication device (e.g. 308 FIG. 3, 508 FIG. 8, 702 FIG. 7) terminated services. The period of exclusion can be defined at least in part by a timer in the communication device (e.g. 308 FIG. 3, 508 FIG. 8, 702 FIG. 7) terminated case and/or at least in part by termination of the call attempt in the communication device (e.g. 308 FIG. 3, 508 FIG. 8, 702 FIG. 7) originated case. In some embodiments, the period of exclusion is determined differently for communication device (e.g. 308 FIG. 3, 508 FIG. 8, 702 FIG. 7) originated and communication device (e.g. 308 FIG. 3, 508 FIG. 8, 702 FIG. 7) terminated services. Further, the period of exclusion may be determined differently for an emergency call and a non-emergency call. The period of exclusion can be defined, for example, by a timer whose value is determined at least in part by the communication device (e.g. 308 FIG. 3, 508 FIG. 8, 702 FIG. 7).

Additionally, the system 1000 can include a memory 1010 that retains instructions for executing functions associated with the component 1006 that is configured to determine if a service is not available on a target set of radio resources and/or the component 1008 that is configured to carry out the preferential search of resources. The memory 1010 may also store instructions associated with additional components of the system 1000, as well as storing other information and data. It should be noted that while the memory 1010 that is depicted in FIG. 10 is shown as a single block, it may comprise two or more separate memories that constitute separate physical and/or logical units. While shown as being external to the memory 1010, it is also to be understood that one or more of components 1006 and 1008 that are shown in FIG. 10 can exist within the memory 1010.

It will be appreciated that the memories that are described in connection with the disclosed embodiments can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Figure 11:
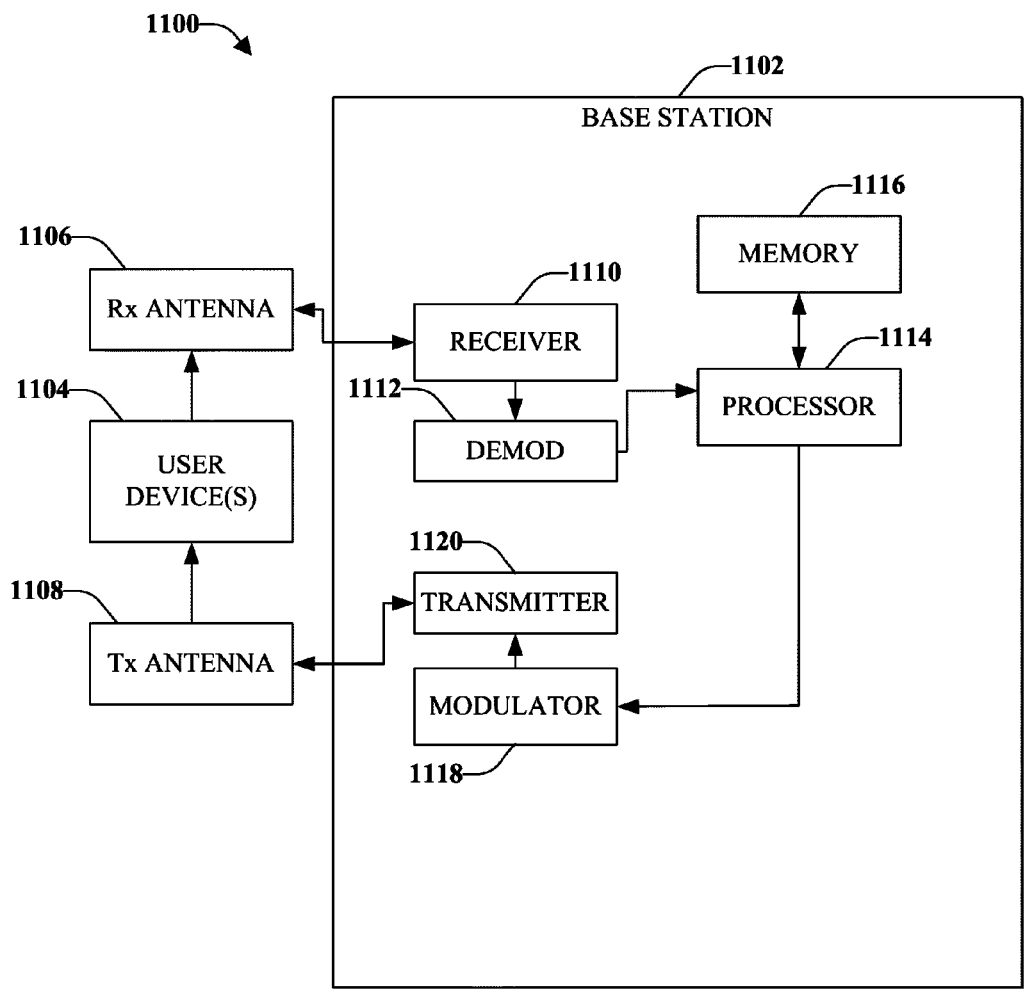
FIG. 11 illustrates a block diagram of a system within which the various disclosed embodiments may be implemented.

FIG. 11 illustrates an exemplary system 1100 which may be used in conjunction with, and/or accommodate, the various disclosed embodiments. The system 1100 of FIG. 11 comprises a base station or access point 1102. As illustrated, the base station 1102 receives signal(s) from one or more communication devices 1104 (e.g., one or more communication devices) by one or more receive antennas 1106, and transmits to the one or more communication devices 1104 through one or more transmit antennas 1108.

The base station 1102 also comprises a receiver 1110 that receives information from the one or more receive antennas 1106 and is operatively associated with a demodulator 1112 that demodulates the received information. Demodulated symbols are analyzed by a processor 1114 that is coupled to a memory 1116 that stores information related to broadcast-multicast waveforms, as well as other information and/or computer executable program code. A modulator 1118 can multiplex the signal for transmission by a transmitter 1120 through one or more transmit antennas 1108 to the communication devices 1104.

Figure 12:
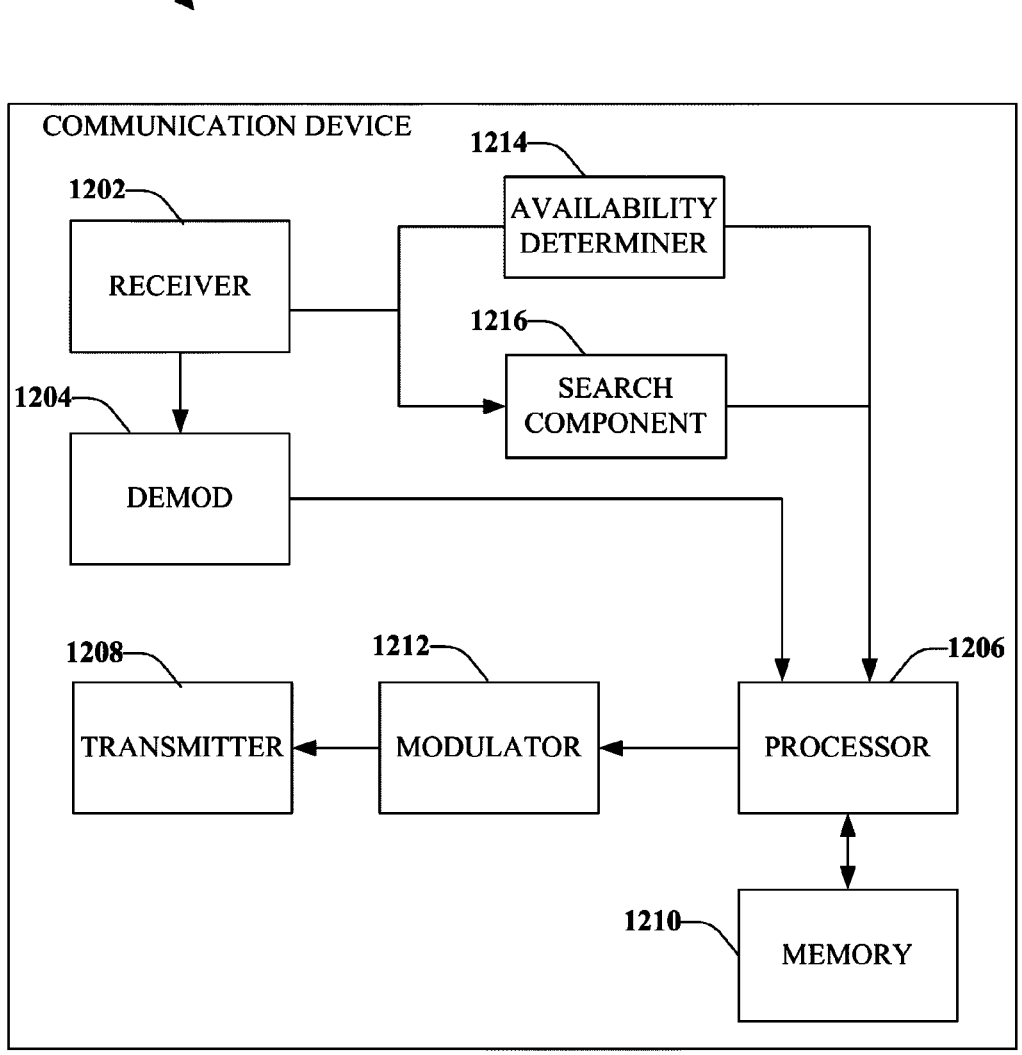
FIG. 12 illustrates a block diagram of a user within which the various disclosed embodiments may be implemented.

FIG. 12 illustrates another exemplary system 1200 that may be used in conjunction with and/or accommodate the various disclosed embodiments. For example, the system 1200 that is shown in FIG. 12 may be configured to facilitate the recovery from failure of a redirection, handover, or cell change order procedure, in accordance with the various disclosed embodiments. The system 1200 of FIG. 12 can reside, at least partially, in a communication device (e.g. 308 FIG. 3, 508 FIG. 8, 702 FIG. 7). The system 1200 comprises a receiver 1202 that can receive a signal from, for example, one or more receiver antennas. The receiver 1202 can perform typical signal conditioning operations thereon, such as filtering, amplifying, down-converting, and the like. The receiver 1202 can also digitize the conditioned signal to obtain samples. A demodulator 1204 can obtain the received symbols for each symbol period, as well as provide the received symbols to a processor 1206.

The processor 1206 of FIG. 12 can be a processor dedicated to analyzing information received by receiver component 1202 and/or generating information for transmission by a transmitter 1208. Additionally or alternatively, the processor 1206 can control one or more components of the system 1200 that are configured to analyze information received by the receiver 1202 and/or generate information for transmission by the transmitter 1208. The processor 1206 may include a controller component capable of coordinating communications with additional communication devices (e.g. 308 FIG. 3, 508 FIG. 8, 702 FIG. 7).

The system 1200 of FIG. 12 can additionally comprise a memory 1208 that is operatively coupled to the processor 1206, and can store information related to coordinating communications, and any other suitable information, as well as computer executable code for causing the system to perform various operations. For example, the memory 1210 can store protocols associated with recovering from failure of a redirection, handover, or cell change order procedure. As noted earlier, the memory 1208 of the subject systems and/or methods is intended to comprise, without being limited to, different types of memory. The system 1200 of FIG. 12 can further comprise a symbol modulator 1212 and a transmitter 1208 that are configured to modulate and transmit the modulated signals, respectively.

The receiver 1202 that is depicted in FIG. 12 is further operatively coupled to an availability determiner 1214 that is configured to determine whether or not a service is available on a specified target set of radio resources. The receiver 1202 is also operatively coupled to a search component 1216 that is configured to preferentially search additional radio resources. For example, the preferential search can include the search or radio resources that are in an association with the target resources before searching for service elsewhere.

The disclosed embodiments provide for expansion of a "redirection procedure" concept to include other mobility-related aspects of a wireless network including handover and cell change order. Further, the disclosed embodiments provide for dependence on cause of the redirection procedure. Load balancing and CS fallback are two non-limiting examples that may trigger a redirection. Further, the disclosed embodiments provide further flexibility by allowing a communication device to select other appropriate RATs before returning to the source system (optionally depending on the redirection cause). Alternatively or additionally, a length of time for which a return to the source set of resources is forbidden, or deprecated, may vary according to the procedure cause.

It is to be understood that the embodiments and features that are described herein may be implemented by hardware, software, firmware or any combination thereof. Various embodiments described herein are described in the general context of methods or processes, which may be implemented in one embodiment by a computer program product, embodied in a computer-readable medium, including computer-executable instructions, such as program code, executed by computers in networked environments. As noted above, a memory and/or a computer-readable medium may include removable and non-removable storage devices including, but not limited to, Read Only Memory (ROM), Random Access Memory (RAM), compact discs (CDs), digital versatile discs (DVD), and the like. When implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

For a software implementation, the techniques described herein may be implemented with modules (e.g., procedures, functions, and so on) that perform the functions described herein. The software codes may be stored in memory units and executed by processors. The memory unit may be implemented within the processor and/or external to the processor, in which case it can be communicatively coupled to the processor through various means as is known in the art. Further, at least one processor may include one or more modules operable to perform the functions described herein.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., communication device-to-communication device) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed embodiments. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a communication device (e.g. 308 FIG. 3, 508 FIG. 8, 702 FIG. 7) in terms of transmit power efficiency.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform the functions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an ASIC. Additionally, the ASIC may reside in a communication device (e.g. 308 FIG. 3, 508 FIG. 8, 702 FIG.

7). In the alternative, the processor and the storage medium may reside as discrete components in a communication device (e.g. 308 FIG. 3, 508 FIG. 8, 702 FIG. 7). Additionally, in some embodiments, the steps and/or actions of a method or algorithm may reside as one or any combination or set of codes and/or instructions on a machine readable medium and/or computer readable medium, which may be incorporated into a computer program product.

While the foregoing disclosure discusses illustrative embodiments, it should be noted that various changes and modifications could be made herein without departing from the scope of the described embodiments as defined by the appended claims. Accordingly, the described embodiments are intended to embrace all such alterations, modifications and variations that fall within scope of the appended claims. Furthermore, although elements of the described embodiments may be described or claimed in the singular, the plural is contemplated unless limitation to the singular is explicitly stated. Additionally, all or a portion of any embodiment may be utilized with all or a portion of any other embodiments, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. A method, comprising:
    determining, on a communication device, an availability of a service on a target set of radio resources from information related to a redirection of the communication device for acquisition of the service, wherein the information comprises an indication of a cause of the redirection; and
    conducting, on the communication device, a preferential search of additional radio resources for acquisition of the service, wherein the preferential search is carried out subsequent to a redirection attempt failure related to the target set of radio resources and in accordance with at least the indicated cause of the redirection.

2. The method of claim 1, wherein the communication device performs a particular redirect procedure based on the cause of the redirection.

3. The method of claim 1, wherein the cause of the redirection is a cause selected from a group consisting of: a load balancing and a circuit switched fallback.

4. The method of claim 1, wherein the redirection is carried out in accordance with a redirection procedure selected from a group consisting of: a handover and a change cell order.

5. The method of claim 1, wherein the information is received from a source set of radio resources, the source set of radio resources comprising a source carrier.

6. The method of claim 5, wherein at least one of the target set of radio resources and the additional radio resources comprises at least a portion of a carrier that is different from the source carrier.

7. The method of claim 1, wherein the information is received from a source set of resource, and wherein at least one of the target set of radio resources and the additional radio resources are associated with a radio access technology that is different from a radio access technology associated with the source set of radio resources.

8. The method of claim 1, wherein the target set of radio resources and the additional radio resources are associated with the same radio access technology.

9. The method of claim 1, wherein the target set of radio resources and the additional radio resources are associated with different radio access technologies.

10. The method of claim 1, wherein at least one of the additional radio resources is capable of providing the service.

11. The method of claim 1, wherein the preferential search is conducted in accordance with at least a type of the service.

12. The method of claim 11, wherein the type of the service is selected from a group consisting of: a voice call, a communication device terminated emergency call and a communication device originated emergency call.

13. The method of claim 1, wherein the additional radio resources comprise a radio resource selected from a group consisting of: one or more registered public land mobile network(s) and one or more non-registered public land mobile network(s).

14. The method of claim 1, wherein the preferential search is conducted in accordance with at least a type of service for which a radio resource control connection is requested.

15. The method of claim 1, wherein the information is received from a source set of resource, and wherein the source set of radio resources is excluded from the preferential search for a predetermined period.

16. The method of claim 15, wherein the predetermined period is a period selected from a group consisting of a period related to a mobile terminated service, a period related to a mobile originated service, a period related to an emergency call, and a period related to a non-emergency call.

17. The method of claim 15, wherein the predetermined period is selected from a group consisting of: a period determined by an entity associated with the source set of resources and a period determined by the communication device.

18. The method of claim 15, wherein the predetermined period is determined in accordance with a parameter selected from the group consisting of: a cause of redirection and a duration of the service.

19. A method, comprising:
    generating an information element, the information element comprising information from a source set of radio resources, the information relating to redirection of a communication device for acquisition of a service on a target set of radio resources, the information comprising an indication of a cause of the redirection, the information enabling a determination that the service is not available on the target set of radio resources and a preferential search of additional radio resources for acquisition of the service, the preferential search to be carried out subsequent to a redirection attempt failure related to the target set of radio resources and in accordance with at least the indicated cause of the redirection; and
    transmitting the information element.

20. An apparatus, comprising:
    means for determining, on a communication device, an availability of a service on a target set of radio resources from information related to a redirection of the communication device for acquisition of the service, wherein the information comprises an indication of a cause of the redirection; and means for conducting, on the communication device, a preferential search of additional radio resources for acquisition of the service, wherein the preferential search is carried out subsequent to a redirection attempt failure related to the target set of radio resources and in accordance with at least the indicated cause of the redirection.

21. An apparatus, comprising:
means for generating an information element, the information element comprising information from a source set of radio resources, the information relating to redirection of a communication device for acquisition of a service on a target set of radio resources, the information comprising an indication of a cause of the redirection, the information enabling a determination that the service is not available on the target set of radio resources and a preferential search of additional radio resources for acquisition of the service the preferential search to be carried out subsequent to a redirection attempt failure related to the target set of radio resources and in accordance with at least the indicated cause of the redirection; and
means for transmitting the information element.

22. An apparatus, comprising:
a processor; and
a memory comprising processor executable code, the processor executable code, when executed by the processor, configures the apparatus to:
determine, on a communication device, an availability of a service on a target set of radio resources from information related to a redirection of the communication device for acquisition of the service, wherein the information comprises an indication of a cause of the redirection; and
conduct, on the communication device, a preferential search of additional radio resources for acquisition of the service, wherein the preferential search is carried out subsequent to a redirection attempt failure related to the target set of radio resources and in accordance with at least the indicated cause of the redirection.

23. The apparatus of claim 22, wherein the processor executable code, when executed by the processor, configures the apparatus to conduct a particular redirect procedure based on the cause of the redirection.

24. The apparatus of claim 22, wherein the cause of the redirection is a cause selected from a group consisting of: a load balancing and a circuit switched fallback.

25. The apparatus of claim 22, wherein the processor executable code, when executed by the processor, configures the apparatus to carry out the redirection using a redirection procedure selected from a group consisting of: a handover and a change cell order.

26. The apparatus of claim 22, wherein the information received from to a source set of radio resources, the source set of radio resources comprising a source carrier.

27. The apparatus of claim 26, wherein at least one of the target set of radio resources and the additional radio resources comprises at least a portion of a carrier that is different from the source carrier.

28. The apparatus of claim 22, wherein the information received from to a source set of radio resources, and wherein at least one of the target set of radio resources and the additional radio resources are associated with a radio access technology that is different from a radio access technology associated with the source set of radio resources.

29. The apparatus of claim 22, wherein the target set of radio resources and the additional radio resources are associated with the same radio access technology.

30. The apparatus of claim 22, wherein the target set of radio resources and the additional radio resources are associated with different radio access technologies.

31. The apparatus of claim 22, wherein at least one of the additional radio resources is capable of providing the service.

32. The apparatus of claim 22, wherein the processor executable code, when executed by the processor, configures the apparatus to conduct the preferential search in accordance with at least a type of the service.

33. The apparatus of claim 32, wherein the type of the service is a service selected from a group consisting of: a voice call, a mobile terminated emergency call and a mobile originated emergency call.

34. The apparatus of claim 22, wherein the additional radio resources comprises a radio network selected from the group consisting of: one or more registered public land mobile network(s) and one or more non-registered public land mobile network(s).

35. The apparatus of claim 22, wherein the processor executable code, when executed by the processor, configures the apparatus to conduct the preferential search in accordance with at least a type of service for which a radio resource control connection is requested.

36. The apparatus of claim 22, wherein the information is received from a source set of resource, and wherein the processor executable code, when executed by the processor, configures the apparatus to exclude the source set of radio resources from the preferential search for a predetermined period after receiving the information.

37. The apparatus of claim 36, wherein the predetermined period is selected from a group consisting of: a period related to a mobile terminated service, a period related to a mobile originated service, a period related to a emergency call, and a period related to a non-emergency call.

38. The apparatus of claim 36, wherein the predetermined period is selected from a group consisting of: a period determined by an entity associated with the source set of resources and a period determined by the communication device.

39. The apparatus of claim 36, wherein the predetermined period is selected in accordance with a parameter selected from a group consisting of: a cause of redirection and a duration of the service.

40. An apparatus, comprising:
a processor; and
a memory comprising processor executable code, the processor executable code, when executed by the processor, configures the apparatus to:
generate an information element, the information element comprising information from a source set of radio resources, the information relating to redirection of a communication device for acquisition of a service on a target set of radio resources, the information comprising an indication of a cause of the redirection, the information enabling a determination that the service is not available on the target set of radio resources and a preferential search of additional radio resources for acquisition of the service, the preferential search to be carried out subsequent to a redirection attempt failure related to the target set of radio resources and in accordance with at least the indicated cause of the redirection; and
transmit the information element.

41. A computer program product, embodied on a computer readable medium, comprising:
program code for determining, on a communication device, an availability of a service on a target set of radio resources from information related to a redirection of the communication device for acquisition of the service, wherein the information comprises an indication of a cause of the redirection; and program code for conducting, on the communication device, a preferential search of additional radio resources for acquisition of the service, wherein the preferential search is carried out subsequent to a redirection attempt failure related to the target set of radio resources and in accordance with at least the indicated cause of the redirection.

42. A computer program product, embodied on a computer readable medium, comprising:

program code for generating an information element, the information element comprising information from a source set of radio resources, the information relating to redirection of a communication device for acquisition of a service on a target set of radio resources, the information comprising an indication of a cause of the redirection, the information enabling a determination that the service is not available on the target set of radio resources and a preferential search of additional radio resources for acquisition of the service, the preferential search to be carried out subsequent to a redirection attempt failure related to the target set of radio resources and in accordance with at least the indicated cause of the redirection; and program code for transmitting the information element.

43. The method of claim 19, wherein the cause of the redirection is a cause selected from a group consisting of a load balancing and a circuit switched fallback.

44. The apparatus of claim 40, wherein the cause of the redirection is a cause selected from a group consisting of a lead balancing and a circuit switched fallback.

45. The apparatus of claim 20, further comprising means for performing a particular redirect procedure based on the cause of the redirection.

46. The apparatus of claim 20, wherein the cause of the redirection is a cause selected from a group consisting of: a load balancing and a circuit switched fallback.

47. The apparatus of claim 20, wherein the redirection is carried out in accordance with a redirection procedure selected from a group consisting of: a handover and a change cell order.

48. The apparatus of claim 20, wherein the means for conducting conducts the preferential search in accordance with at least a type of the service.

49. The apparatus of claim 48, wherein the type of the service is selected from a group consisting of: a voice call, a communication device terminated emergency call and a communication device originated emergency call.

50. The apparatus of claim 21, wherein the cause of the redirection is a cause selected from a group consisting of: a load balancing and a circuit switched fallback.

* * * * *